(12) United States Patent
Zadesky et al.

(10) Patent No.: US 7,348,967 B2
(45) Date of Patent: *Mar. 25, 2008

(54) TOUCH PAD FOR HANDHELD DEVICE

(75) Inventors: Stephen Paul Zadesky, San Carlos, CA (US); Tang Yew Tan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 11/386,238

(22) Filed: Mar. 21, 2006

(65) Prior Publication Data

US 2007/0013671 A1    Jan. 18, 2007

Related U.S. Application Data

(63) Continuation of application No. 10/188,182, filed on Jul. 1, 2002, now Pat. No. 7,046,230.

(60) Provisional application No. 60/359,551, filed on Feb. 25, 2002.

(51) Int. Cl.
   *G09G 5/00*    (2006.01)
(52) U.S. Cl. .................. 345/173; 345/156; 345/157; 345/168; 345/169; 345/174; 455/550; 455/566; 455/575
(58) Field of Classification Search ........... 345/156, 345/157, 160, 169, 163, 173–178
   See application file for complete search history.

(56) References Cited

U.S. PATENT DOCUMENTS

| | | | |
|---|---|---|---|
| 1,061,578 A | 5/1913 | Wischhusen et al. |
| 2,798,907 A | 7/1957 | Schneider |
| 2,903,229 A | 9/1959 | Lange |
| 2,945,111 A | 7/1960 | McCormick |
| 3,005,055 A | 10/1961 | Mattke |
| 3,965,399 A | 6/1976 | Walker et al. |
| 4,103,252 A | 7/1978 | Bobick |
| 4,121,204 A | 10/1978 | Welch et al. |
| 4,129,747 A | 12/1978 | Pepper |
| 4,158,216 A | 6/1979 | Bigelow |
| 4,242,676 A | 12/1980 | Piguet et al. |
| 4,246,452 A | 1/1981 | Chandler |
| 4,293,734 A | 10/1981 | Peper, Jr. |
| D264,969 S | 6/1982 | McGoutry |
| 4,380,007 A | 4/1983 | Steinegger |
| 4,380,040 A | 4/1983 | Posset |
| 4,475,008 A | 10/1984 | Doi et al. |
| 4,570,149 A | 2/1986 | Thornburg et al. |

(Continued)

FOREIGN PATENT DOCUMENTS

CN    1139235 A    1/1997

(Continued)

OTHER PUBLICATIONS

"Atari VCS/2600 Peripherals", www.classicgaming.com, downloaded Feb. 28, 2007, pp. 1-15.

(Continued)

*Primary Examiner*—Richard Hjerpe
*Assistant Examiner*—Jennifer T Nguyen
(74) *Attorney, Agent, or Firm*—Morrison & Foerster LLP

(57) ABSTRACT

A media player having a touch pad is disclosed.

23 Claims, 7 Drawing Sheets

U.S. PATENT DOCUMENTS

| | | |
|---|---|---|
| 4,587,378 A | 5/1986 | Moore |
| 4,644,100 A | 2/1987 | Brenner et al. |
| 4,734,034 A | 3/1988 | Maness et al. |
| 4,736,191 A * | 4/1988 | Matzke et al. ................ 341/20 |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,798,919 A | 1/1989 | Miessler et al. |
| 4,810,992 A | 3/1989 | Eventoff |
| 4,831,359 A | 5/1989 | Newell |
| 4,849,852 A | 7/1989 | Mullins |
| 4,856,993 A | 8/1989 | Maness et al. |
| 4,897,511 A | 1/1990 | Itaya et al. |
| 4,914,624 A | 4/1990 | Dunthorn |
| 4,951,036 A | 8/1990 | Grueter et al. |
| 4,976,435 A | 12/1990 | Shatford et al. |
| 4,990,900 A | 2/1991 | Kikuchi |
| 5,008,497 A | 4/1991 | Asher |
| 5,036,321 A | 7/1991 | Leach et al. |
| 5,053,757 A | 10/1991 | Meadows |
| 5,159,159 A | 10/1992 | Asher |
| 5,192,082 A | 3/1993 | Inoue et al. |
| 5,231,326 A | 7/1993 | Echols |
| 5,305,017 A | 4/1994 | Gerpheide |
| 5,367,199 A | 11/1994 | Lefkowitz et al. |
| 5,374,787 A | 12/1994 | Miller et al. |
| 5,408,621 A | 4/1995 | Ben-Arie |
| 5,416,498 A | 5/1995 | Grant |
| 5,424,756 A | 6/1995 | Ho et al. |
| 5,432,531 A | 7/1995 | Calder et al. |
| 5,450,075 A | 9/1995 | Waddington |
| 5,453,761 A | 9/1995 | Tanaka |
| 5,479,192 A | 12/1995 | Carroll, Jr. et al. |
| 5,508,703 A | 4/1996 | Okamura et al. |
| 5,543,588 A | 8/1996 | Bisset et al. |
| 5,559,301 A | 9/1996 | Bryan, Jr. et al. |
| 5,564,112 A | 10/1996 | Hayes et al. |
| 5,581,670 A | 12/1996 | Bler et al. |
| 5,589,893 A | 12/1996 | Gaughan et al. |
| 5,613,137 A | 3/1997 | Bertram et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| 5,657,012 A | 8/1997 | Tart |
| 5,661,632 A | 8/1997 | Register |
| 5,689,285 A | 11/1997 | Asher |
| 5,777,605 A | 7/1998 | Yoshinobu et al. |
| 5,790,769 A | 8/1998 | Buxton et al. |
| 5,805,144 A | 9/1998 | Scholder et al. |
| 5,841,423 A | 11/1998 | Carroll, Jr. et al. |
| 5,859,629 A | 1/1999 | Tognazzini |
| 5,875,311 A | 2/1999 | Bertram et al. |
| 5,889,511 A | 3/1999 | Ong et al. |
| 5,903,229 A | 5/1999 | Kishi |
| 5,923,388 A | 7/1999 | Kurashima et al. |
| D412,940 S | 8/1999 | Kato et al. |
| 5,943,044 A | 8/1999 | Martinelli et al. |
| 5,964,661 A | 10/1999 | Dodge |
| 5,973,668 A | 10/1999 | Watanabe |
| 6,000,000 A | 12/1999 | Hawkins et al. |
| 6,025,832 A | 2/2000 | Sudo et al. |
| 6,034,672 A | 3/2000 | Gaultiet et al. |
| 6,057,829 A | 5/2000 | Silfvast |
| D430,169 S | 8/2000 | Scibora |
| 6,122,526 A | 9/2000 | Parulski et al. |
| D437,860 S | 2/2001 | Suzuki et al. |
| 6,226,534 B1 | 5/2001 | Aizawa |
| 6,227,966 B1 | 5/2001 | Yokoi |
| 6,243,080 B1 | 6/2001 | Molne |
| 6,248,017 B1 | 6/2001 | Roach |
| 6,254,477 B1 | 7/2001 | Sasaki et al. |
| 6,262,785 B1 | 7/2001 | Kim |
| D448,810 S | 10/2001 | Goto |
| D450,713 S | 11/2001 | Masamitsu et al. |
| 6,314,483 B1 | 11/2001 | Goto et al. |
| D452,250 S | 12/2001 | Chan |
| 6,357,887 B1 | 3/2002 | Novak |
| D455,793 S | 4/2002 | Lin |
| 6,424,338 B1 | 7/2002 | Anderson |
| 6,429,846 B2 | 8/2002 | Rosenberg et al. |
| 6,473,069 B1 | 10/2002 | Gerphelde |
| 6,492,979 B1 | 12/2002 | Kent et al. |
| 6,496,181 B1 | 12/2002 | Bomer et al. |
| 6,497,412 B1 | 12/2002 | Bramm |
| D468,365 S | 1/2003 | Bransky et al. |
| D469,109 S | 1/2003 | Andre et al. |
| D472,245 S | 3/2003 | Andre et al. |
| 6,639,584 B1 * | 10/2003 | Li .............................. 345/173 |
| D483,809 S | 12/2003 | Lim |
| 6,664,951 B1 * | 12/2003 | Fujii et al. .................. 345/173 |
| D489,731 S | 5/2004 | Huang |
| 6,750,803 B2 | 6/2004 | Yates et al. |
| 6,781,576 B2 * | 8/2004 | Tamura ....................... 345/173 |
| 6,788,288 B2 | 9/2004 | Ano |
| D497,618 S | 10/2004 | Andre et al. |
| 6,886,842 B2 | 5/2005 | Vey et al. |
| 6,894,916 B2 | 5/2005 | Reohr et al. |
| D506,476 S | 6/2005 | Andre et al. |
| 6,922,189 B2 | 7/2005 | Fujiyoshi |
| 6,930,494 B2 | 8/2005 | Tesdahl et al. |
| 6,977,808 B2 | 12/2005 | Lam et al. |
| 6,978,127 B1 | 12/2005 | Bulthuis et al. |
| 7,046,230 B2 | 5/2006 | Zadesky et al. |
| 7,069,044 B2 | 6/2006 | Okada et al. |
| 7,084,856 B2 | 8/2006 | Huppi |
| 7,113,196 B2 | 9/2006 | Kerr |
| 7,113,520 B1 | 9/2006 | Meenan |
| 7,215,319 B2 | 5/2007 | Kamijo et al. |
| 7,236,154 B1 | 6/2007 | Kerr et al. |
| 2002/0027547 A1 | 3/2002 | Kamijo |
| 2002/0045960 A1 | 4/2002 | Phillips et al. |
| 2002/0118131 A1 | 8/2002 | Yates et al. |
| 2003/0002246 A1 | 1/2003 | Kerr |
| 2003/0025679 A1 | 2/2003 | Taylor et al. |
| 2003/0043174 A1 | 3/2003 | Hinckley et al. |
| 2003/0095095 A1 | 5/2003 | Pihlaja |
| 2003/0184517 A1 | 10/2003 | Senzui et al. |
| 2003/0206202 A1 | 11/2003 | Moriya |
| 2004/0156192 A1 | 8/2004 | Kerr et al. |
| 2004/0215986 A1 | 10/2004 | Shakkarwar |
| 2004/0224638 A1 | 11/2004 | Fadell et al. |
| 2004/0253989 A1 | 12/2004 | Tupler et al. |
| 2004/0263388 A1 | 12/2004 | Krumm et al. |
| 2004/0267874 A1 | 12/2004 | Westberg et al. |
| 2005/0052425 A1 | 3/2005 | Zadesky et al. |
| 2006/0026521 A1 | 2/2006 | Hotelling et al. |
| 2006/0097991 A1 | 5/2006 | Hotelling et al. |
| 2006/0181517 A1 | 8/2006 | Zadesky et al. |
| 2006/0197750 A1 | 9/2006 | Kerr et al. |
| 2006/0250377 A1 | 11/2006 | Zadesley et al |
| 2006/0274905 A1 | 12/2006 | Lindahl et al. |
| 2007/0013671 A1 | 1/2007 | Zadesky et al. |
| 2007/0052044 A1 | 3/2007 | Forsblad et al. |
| 2007/0052691 A1 | 3/2007 | Zadesky et al. |
| 2007/0080936 A1 | 4/2007 | Tsuk et al. |
| 2007/0080938 A1 | 4/2007 | Robbin et al. |
| 2007/0083822 A1 | 4/2007 | Robbin et al. |
| 2007/0085841 A1 | 4/2007 | Tsuk et al. |
| 2007/0152977 A1 | 7/2007 | Ng et al. |

| | | |
|---|---|---|
| 2007/0152983 A1 | 7/2007 | McKillop et al. |

FOREIGN PATENT DOCUMENTS

| | | |
|---|---|---|
| CN | 1455615 | 11/2003 |
| CN | 1499356 | 5/2004 |
| DE | 3615742 | 11/1987 |
| DE | 20019074 U1 | 2/2001 |
| EP | 0521683 A2 | 1/1993 |
| EP | 0674288 A1 | 9/1995 |
| EP | 0 731 407 A1 | 9/1996 |
| EP | 0 551 778 B1 | 1/1997 |
| EP | 0551778 B1 | 1/1997 |
| EP | 1081922 A2 | 3/2001 |
| EP | 1098241 A2 | 5/2001 |
| EP | 1 162 826 | 12/2001 |
| EP | 1205836 A2 | 5/2002 |
| EP | 1251455 A2 | 10/2002 |
| EP | 1482401 A2 | 12/2004 |
| EP | 1542437 A2 | 6/2005 |
| FR | 2 686 440 A1 | 7/1993 |
| GB | 2315186 | 1/1998 |
| GB | 2391060 | 1/2004 |
| GB | 2402105 A | 12/2004 |
| JP | 55-174009 | 6/1982 |
| JP | 57-95722 | 6/1982 |
| JP | 61-117619 | 6/1986 |
| JP | 61-124009 | 6/1986 |
| JP | 61-164547 | 1/1988 |
| JP | 63-181022 | 7/1988 |
| JP | 63-298518 | 12/1988 |
| JP | 03-57617 | 6/1991 |
| JP | 04-32920 | 2/1992 |
| JP | 5-041135 | 2/1993 |
| JP | 5-101741 | 4/1993 |
| JP | 05080938 A | 4/1993 |
| JP | 05-36623 | 5/1993 |
| JP | 5-189110 | 7/1993 |
| JP | 5-205565 | 8/1993 |
| JP | 5-211021 | 8/1993 |
| JP | 5-217464 | 8/1993 |
| JP | 05-233141 | 9/1993 |
| JP | 05-262276 | 10/1993 |
| JP | 5-265656 | 10/1993 |
| JP | 5-274956 | 10/1993 |
| JP | 05-289811 | 11/1993 |
| JP | 5-298955 | 11/1993 |
| JP | 5-325723 | 12/1993 |
| JP | 06-20570 | 1/1994 |
| JP | 6-084428 | 3/1994 |
| JP | 6-089636 | 3/1994 |
| JP | 06-096639 | 4/1994 |
| JP | 6-96639 | 4/1994 |
| JP | 06-111685 | 4/1994 |
| JP | 06-111695 | 4/1994 |
| JP | 6-111695 | 4/1994 |
| JP | 6-139879 | 5/1994 |
| JP | 06-187078 | 7/1994 |
| JP | 06-208433 | 7/1994 |
| JP | 6-267382 | 9/1994 |
| JP | 06-283993 | 10/1994 |
| JP | 6-333459 | 12/1994 |
| JP | 07-107574 | 4/1995 |
| JP | 7-107574 | 4/1995 |
| JP | 07-107574 A | 4/1995 |
| JP | 7-41882 | 7/1995 |
| JP | 07-41882 | 7/1995 |
| JP | 7-201249 | 8/1995 |
| JP | 07-201256 | 8/1995 |
| JP | 07-253838 | 10/1995 |
| JP | 7-261899 | 10/1995 |
| JP | 07-261899 | 10/1995 |
| JP | 7-261922 | 10/1995 |
| JP | 07-296670 | 11/1995 |
| JP | 08-016292 | 1/1996 |
| JP | 08-115158 | 5/1996 |
| JP | 8-203387 | 8/1996 |
| JP | 8-293226 | 11/1996 |
| JP | 8-298045 | 11/1996 |
| JP | 08-299541 | 11/1996 |
| JP | 8-316664 | 11/1996 |
| JP | 09-044289 | 2/1997 |
| JP | 09-069023 | 3/1997 |
| JP | 09-128148 | 5/1997 |
| JP | 9-218747 | 8/1997 |
| JP | 09-230993 | 9/1997 |
| JP | 9-230993 | 9/1997 |
| JP | 9-231858 | 9/1997 |
| JP | 09-233161 | 9/1997 |
| JP | 9-251347 | 9/1997 |
| JP | 9-258895 | 10/1997 |
| JP | 9-288926 | 11/1997 |
| JP | 10-074429 | 3/1998 |
| JP | 10-198507 | 7/1998 |
| JP | 10-227878 | 8/1998 |
| JP | 11-184607 | 7/1999 |
| JP | 11-194863 * | 7/1999 |
| JP | 11-203045 | 7/1999 |
| JP | A10-012010 | 7/1999 |
| JP | A10-012025 | 7/1999 |
| JP | A10-012026 | 7/1999 |
| JP | A10-012027 | 7/1999 |
| JP | A10-012028 | 7/1999 |
| JP | A10-012029 | 7/1999 |
| JP | 11-272378 | 10/1999 |
| JP | A10-089535 | 10/1999 |
| JP | 2000-267786 | 9/2000 |
| JP | 2000-353045 | 12/2000 |
| JP | 2001-11769 | 1/2001 |
| JP | 2001-22508 | 1/2001 |
| JP | 2002-215311 | 8/2002 |
| JP | 2003280807 | 2/2003 |
| JP | A2005-99635 | 9/2005 |
| JP | A2005-133824 | 10/2005 |
| JP | A2005-134953 | 10/2005 |
| JP | A2005-235579 | 1/2006 |
| JP | A2005-358970 | 7/2006 |
| JP | 3852854 | 9/2006 |
| JP | 3852854 | 12/2006 |
| JP | A2005-312433 | 5/2007 |
| KR | 1998-71394 | 10/1998 |
| KR | 1999-50198 | 7/1999 |
| KR | 2000-8579 | 2/2000 |
| TW | 431607 | 4/2001 |
| WO | WO 95/00897 A1 | 1/1995 |
| WO | WO-03/044645 A1 | 5/2003 |
| WO | WO-2005/055620 A2 | 6/2005 |
| WO | WO-2005/124526 A2 | 12/2005 |

OTHER PUBLICATIONS

"Alps Electric introduces the GlidePoint Wave Keyboard; combines a gently curved design with Alps' advanced GlidePoint Technology", Business Wire, (Oct. 21, 1996).

Alps Electric Ships GlidePoint Keyboard for the Macintosh; Includes a GlidePoint Touchpad, Erase-Eaze Backspace Kep and Contoured Wrist Rest, Business Wire, (Jul. 1, 1996).

"APS show guide to exhibitors", Physics Today, 49(3) (Mar. 1996).

"Design News literature plus", Design News, 51(24) (Dec. 18, 1995).

"Manufactures", Laser Focus World, Buyers Guide '96, 31(12) (Dec. 1995).

"National Design Engineering Show", Design News, 52(5) (Mar. 4, 1996).

"Preview of exhibitor booths at the Philadelphia show", Air Conditioning Heating & Refrigerator News, 200(2) (Jan. 13, 1997).

"Product news", Design News, 53(11) (Jun. 9, 1997).

"Product news", Design News, 53(9) (May 5, 1997).

Ahl, David, "Controller Updated", Creative Computing 9(12) (Dec. 1983).

Baig, E.C., "Your PC Might Just Need a Mouse", U.S. News and World Report, 108(22), (Jun. 4, 1990).

Bartimo, Jim, "The Portables: Traveling Quickly", Computerworld (Nov. 14, 1983).

Brink et al., "Pumped-up portables", U.S. News & World Report, 116(21) (May 30, 1994).

Brown et al., "Windows on Tablets as a Means of Achieving Virtual Input Devices", Human-Computer Interaction—INTERACT '90 (1990).

Buxton et al., "Issues and Techniques in Touch-Sensitive Tablet Input", Computer Graphics, 19(3), Proceedings of SIGGRAPH '85 (1985).

Chen et al., "A Study in Interactive 3-D Rotation Using 2-D Control Devices", Computer Graphics 22(4) (Aug. 1988).

Evans et al., "Tablet-based Valuators that Provide One, Two, or Three Degrees of Freedom", Computer Graphics 15(3) (Aug. 1981).

Jesitus, John, "Broken promises?", Industry Week/IW, 246(20) (Nov. 3, 1997).

Mims, Forrest M. III, "A Few Quick Pointers; Mouses, Touch Screens, Touch Pads, Light Pads, and the Like Can Make Your System Easier to Use", Computers and Electronics, 22, (May 1984).

Nass, Richard, "Touchpad input device goes digital to give portable systems a desktop "mouse-like" feel", Electronic Design, 44(18) (Sep. 3, 1996).

Perenson, Melissa, "New & Improved: Touchpad Redux", PC Magazine (Sep. 10, 1996).

Petersen, Marty, "Koalapad Touch Tablet & Micro Illustrator Software", InfoWorld, (Oct. 10, 1983).

Petruzzellis, "Force-Sensing Resistors" Electronics Now, 64(3), (Mar. 1993).

Soderholm, Lars D., "Sensing Systems for 'Touch and Feel'", Design News, (May 8, 1989).

Sony presents "Choice Without Compromise" at IBC '97 M2 PRESSWIRE (Jul. 24, 1997.).

Spiwak, Marc, "A Great New Wireless Keyboard", Popular Electronics, 14(12) (Dec. 1997).

Spiwak, Marc, "A Pair of Unusual Controllers", Popular Electronics, 14(4) (Apr. 1997).

Tessler, Franklin, "Point Pad", Macworld 12(10) (Oct. 1995).

Tessler, Franklin, "Smart Input: How to Choose from the New Generation of Innovative Input Devices", Macworld 13(5) (May 1996).

Tessler, Franklin, "Touchpads", Macworld 13(2) (Feb. 1996).

"Triax Custom Controllers Due; Video Game Controllers," HFD—The Weekly Home Furnishings Newspaper, 67(1), (Jan. 4, 1993).

Chinese Office Action issue Dec. 29, 2006, directed to CN Application No. 200510103886.3, 25 pages.

"Apple Presents iPod: Ultra-Portable MP3 Music Player Puts 1,000 Songs in Your Pocket," retreived from http://www.apple.com/pr/library/2001/oct/23ipod.html on Oct. 23, 2001.

"System Service and Troubleshooting Manual," www.dsplib.com/intv/Master, downloaded Dec. 11, 2002.

Bray, "Phosphors help switch on xenon," Physics in Action, pp. 1-3, Apr. 1999.

EVB Elektronik "TSOP6238 IR Receiver Modules for Infrared Remote Control Systems" dated Jan. 2004 1 page.

Gfroerer, "Photoluminescence in Analysis of Surfaces and Interfaces," Encyclopedia of Analytical Chemistry, pp. 1-23, Copyright John Wiley & Sons Ltd, Chichester, 2000.

Luna Technologies International, Inc., LUNA Photoluminescent Safety Products, "Photoluminescence—What is Photoluminescence?" from website at http://www.lunaplast.com/photoluminescence.com on Dec. 27, 2005.

Ahmad, "A Usable Real-Time 3D Hand Tracker," Proceedings of the 28th Asilomar Conference on Signals, Systems and Computers—Part 2 (of 2) vol. 2 (Oct. 1994), 5 pages.

Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).

Kobayashi et al. (1997) "Dynamic Soundscape: Mapping Time to Space for Audio Browsing," *Computer Human Interaction*: 16 pages.

Kobayashi et al. "Development of the Touch Switches with the Click Response," Koukuu Denshi Gihou No. 17: pp. 44-48 (Mar. 1994) (published by the Japan Aviation Electronics Industry, Ltd.); Translation of Summary.

* cited by examiner

TOUCH PAD FOR HANDHELD DEVICE

CROSS REFERENCE TO RELATED APPLICATION

This application is a continuation of U.S. patent application Ser. No. 10/188,182, entitled "Touch Pad for Handheld Device" filed Jul. 1, 2002 now U.S. Pat. No. 7,046,230 which is incorporated herein by referenced, which claims priority of U.S. patent application Ser. No.: 60/359,551, entitled "Touch Pad for Handheld Device," filed on Feb. 25, 2002, and which is incorporated herein by reference.

This application is related to U.S. patent application Ser. No.: 60/346,237, entitled "Method and System for List Scrolling," filed on Oct. 22, 2001, and which is incorporated herein by reference.

This application is related to U.S. patent application Ser. No.: 10/256,716, entitled "METHOD AND APPARATUS FOR ACCELERATED SCROLLING," filed on Sep. 26, 2002 and which is incorporated herein by reference.

This application is also related to U.S. Design patent application Ser. No. 29/153,169, entitled "MEDIA PLAYER," filed on Oct. 22, 2001, and which is incorporated herein by reference.

BACKGROUND OF THE INVENTION

1. Field of the Invention

The present invention relates generally to a media player having a touch pad. More particularly, the present invention relates to touch pads having scrolling features.

2. Description of the Related Art

There exist today many styles of input devices for performing operations in a consumer electronic device. The operations generally correspond to moving a cursor and making selections on a display screen. By way of example, the input devices may include buttons, switches, keyboards, mice, trackballs, touch pads, joy sticks, touch screens and the like. Each of these devices has advantages and disadvantages that are taken into account when designing the consumer electronic device. In handheld computing devices, the input devices are generally selected from buttons and switches. Buttons and switches are generally mechanical in nature and provide limited control with regards to the movement of a cursor (or other selector) and making selections. For example, they are generally dedicated to moving the cursor in a specific direction (e.g., arrow keys) or to making specific selections (e.g., enter, delete, number, etc.). In the case of hand-held personal digital assistants (PDA), the input devices tend to utilize touch-sensitive display screens. When using a touch screen, a user makes a selection on the display screen by pointing directly to objects on the screen using a stylus or finger.

In portable computing devices such as laptop computers, the input devices are commonly touch pads. With a touch pad, the movement of an input pointer (i.e., cursor) corresponds to the relative movements of the user's finger (or stylus) as the finger is moved along a surface of the touch pad. Touch pads can also make a selection on the display screen when one or more taps are detected on the surface of the touch pad. In some cases, any portion of the touch pad may be tapped, and in other cases a dedicated portion of the touch pad may be tapped. In stationary devices such as desktop computers, the input devices are generally selected from mice and trackballs. With a mouse, the movement of the input pointer corresponds to the relative movements of the mouse as the user moves the mouse along a surface. With a trackball, the movement of the input pointer corresponds to the relative movements of a ball as the user rotates the ball within a housing. Both mice and trackballs generally include one or more buttons for making selections on the display screen.

In addition to allowing input pointer movements and selections with respect to a GUI presented on a display screen, the input devices may also allow a user to scroll across the display screen in the horizontal or vertical directions. For example, mice may include a scroll wheel that allows a user to simply roll the scroll wheel forward or backward to perform a scroll action. In addition, touch pads may provide dedicated active areas that implement scrolling when the user passes his or her finger linearly across the active area in the x and y directions. Both devices may also implement scrolling via horizontal and vertical scroll bars as part of the GUI. Using this technique, scrolling is implemented by positioning the input pointer over the desired scroll bar, selecting the desired scroll bar, and moving the scroll bar by moving the mouse or finger in the y direction (forwards and backwards) for vertical scrolling or in the x direction (left and right) for horizontal scrolling.

With regards to touch pads, mice and track balls, a Cartesian coordinate system is used to monitor the position of the finger, mouse and ball, respectively, as they are moved. The Cartesian coordinate system is generally defined as a two dimensional coordinate system (x, y) in which the coordinates of a point (e.g., position of finger, mouse or ball) are its distances from two intersecting, often perpendicular straight lines, the distance from each being measured along a straight line parallel to each other. For example, the x, y positions of the mouse, ball and finger may be monitored. The x, y positions are then used to correspondingly locate and move the input pointer on the display screen.

To elaborate further, touch pads generally include one or more sensors for detecting the proximity of the finger thereto. By way of example, the sensors may be based on resistive sensing, surface acoustic wave sensing, pressure sensing (e.g., strain gauge), optical sensing, capacitive sensing and the like. The sensors are generally dispersed about the touch pad with each sensor representing an x, y position. In most cases, the sensors are arranged in a grid of columns and rows. Distinct x and y position signals, which control the x, y movement of a pointer device on the display screen, are thus generated when a finger is moved across the grid of sensors within the touch pad. For brevity sake, the remaining discussion will be held to the discussion of capacitive sensing technologies. It should be noted, however, that the other technologies have similar features.

Capacitive sensing touch pads generally contain several layers of material. For example, the touch pad may include a protective shield, one or more electrode layers and a circuit board. The protective shield typically covers the electrode layer(s), and the electrode layer(s) is generally disposed on a front side of the circuit board. As is generally well known, the protective shield is the part of the touch pad that is touched by the user to implement cursor movements on a display screen. The electrode layer(s), on the other hand, is used to interpret the x, y position of the user's finger when the user's finger is resting or moving on the protective shield. The electrode layer(s) typically consists of a plurality of electrodes that are positioned in columns and rows so as to form a grid array. The columns and rows are generally based on the Cartesian coordinate system and thus the rows and columns correspond to the x and y directions.

The touch pad may also include sensing electronics for detecting signals associated with the electrodes. For example, the sensing electronics may be adapted to detect the change in capacitance at each of the electrodes as the finger passes over the grid. The sensing electronics are generally located on the backside of the circuit board. By way of example, the sensing electronics may include an application specific integrated circuit (ASIC) that is configured to measure the amount of capacitance in each of the electrodes and to compute the position of finger movement based on the capacitance in each of the electrodes. The ASIC may also be configured to report this information to the computing device.

Referring to FIG. 1, a touch pad 10 will be described in greater detail. The touch pad is generally a small rectangular area that includes a protective shield 12 and a plurality of electrodes 14 disposed underneath the protective shield layer 12. For ease of discussion, a portion of the protective shield layer 12 has been removed to show the electrodes 14. Each of the electrodes 14 represents a different x, y position. In one configuration, as a finger 16 approaches the electrode grid 14, a tiny capacitance forms between the finger 16 and the electrodes 14 proximate the finger 16. The circuit board/sensing electronics measures capacitance and produces an x, y input signal 18 corresponding to the active electrodes 14 is sent to a host device 20 having a display screen 22. The x, y input signal 18 is used to control the movement of a cursor 24 on a display screen 22. As shown, the input pointer moves in a similar x, y direction as the detected x, y finger motion.

SUMMARY OF THE INVENTION

The invention relates, in one embodiment, to a media player for storing and playing media such as audio, video or images. The media player includes a housing that encloses internally various electrical components that provide computing operations for the media player. The media player also includes a touch pad supported by the housing and configured to provide one or more control functions for controlling various applications associated with the media player.

The invention relates, in another embodiment, to a pocket sized handheld computing device. The computing device includes computing hardware for providing at least one application. The computing device also includes a display screen configured to display text and graphics associated with the at least one application. The computing device additionally includes a touch pad configured to provide one or more control functions for allowing a user of the computing device to provide inputs to the at least one application.

The invention relates, in another embodiment, to a touch pad assembly for use in a computing device. The touch pad assembly has a touch sensitive surface for accepting contact with an object. The touch pad assembly is configured to provide polar coordinate information of the object relative to the touch sensitive surface when the object is moved about the touch sensitive surface.

The invention relates, in another embodiment, to a user input system having a touch pad, a display and a controller. The system is configured to convert angular or radial data associated with the touch pad into control inputs associated with the display. By way of example, the control inputs may correspond to translational movements associated with scrolling or other related linear actions.

The invention relates, in another embodiment, to a battery powered handheld music player. The handheld music player includes a housing that supports various electrical components that provide computing operations for the music player. The handheld music player also includes a memory device disposed inside the housing and configured to store a plurality of songs in a digital format. The handheld music player additionally includes a display screen provided at a first portion of a front surface of the housing, and configured to present a list of songs from the plurality of stored songs and to present a visual indicator that is capable of linearly traversing through the list of songs in order to designate a specific song from the list of songs. The handheld music player further includes a touch pad assembly provided at a second portion of the front surface of the housing. The touch pad assembly is configured to track the motion of a finger sliding thereon. The touch pad assembly includes a planar touch surface that is dimensioned to allow sliding movement of a finger thereon.

Moreover, the handheld music player includes a controller disposed inside the housing and configured to acquire motion information from the touch pad assembly and to control various features of the music player based on motion information provided by the touch pad assembly. The features include at least moving the visual indicator through the list of songs. The direction and speed of the movement of the visual indicator is based at least in part on the direction and speed of the finger sliding across the planar touch surface of the touch pad assembly. The handheld music player also includes a button provided at the front surface of the housing, and configured to select the specific song designated by the visual indicator. The handheld music player additionally includes an audio feedback device disposed inside the housing, and configured to provide audio feedback in conjunction with movement of the visual indicator as it traverses through the song list. The handheld music player further includes audio output components for outputting music associated with the selected specific song from the list of songs, the components including at least an amplifier and a headphone jack.

The invention relates, in another embodiment, to a battery powered handheld music player. The handheld music player includes a housing that supports various electrical components that provide computing operations for the music player. The handheld music player also includes a memory device disposed inside the housing and configured to store a plurality of songs in a digital format. The handheld music player additionally includes a display screen provided at a front surface of the housing, and configured to present a list of songs from the plurality of stored songs and to present a visual indicator that is capable of linearly traversing through the list of songs in order to designate a specific song from the list of songs. The handheld music player further includes a touch pad assembly provided at the front surface of the housing. The touch pad assembly is configured to track the motion of a finger sliding thereon. The touch pad assembly includes a planar touch surface that is dimensioned to allow sliding movement of a finger thereon.

Moreover, the handheld music player includes a controller disposed inside the housing and configured to acquire motion information from the touch pad assembly and to control various features of the music player based on motion information provided by the touch pad assembly. The features include at least moving the visual indicator through the list of songs. The direction and speed of the movement of the visual indicator is based at least in part on the direction and speed of the finger sliding across the planar touch surface of the touch pad assembly. The handheld music player also includes audio output components for outputting music associated with the selected specific song from the list of songs, the components including at least an amplifier and a headphone jack.

The invention relates, in another embodiment, to a media player for storing and playing media such as audio, video or images. The media player includes a housing that encloses internally various electrical components that provide computing operations for the media player. The media player also includes a touch pad supported at the housing and providing a first user input element for the media player. The touch pad includes input areas for processing input from a finger sliding across any portion of the touch pad. The media player further includes-a button that is visibly distinct from the touch pad and providing a second user input element for the media player. The button processes input from a finger pressing thereon. The media player additionally includes-one or more media delivery devices configured to output media.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The present invention relates to touch pads. According to one aspect of the invention, a touch pad is provided on a media player to facilitate user interaction therewith. In one embodiment, the media player is a handheld device. According to another aspect of the invention, a touch pad is provided that can sense and resolve angular and/or radial positions of a moving object (e.g., finger) as it is moved in a largely rotational and/or radial manner across the touch pad. In one embodiment, the touch pad that is based on polar coordinates rather than Cartesian coordinates. Other aspects of the invention will become apparent below. In any case, the aspects are not limiting and the various aspects of the invention can be used separately or in combination.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
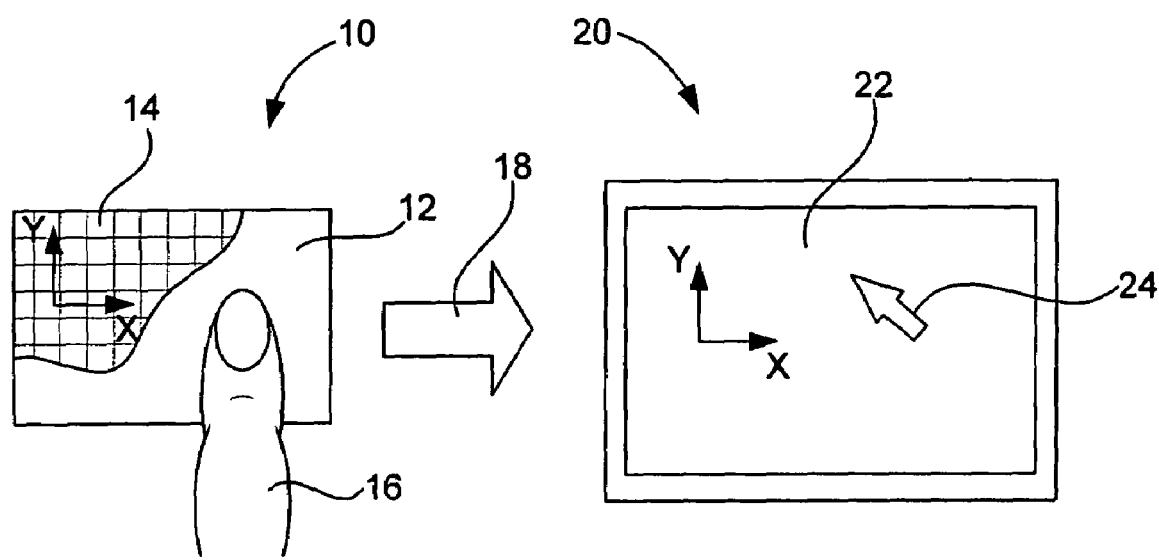
FIG. 1 is a simplified diagram of a touch pad and display.
Figure 2:
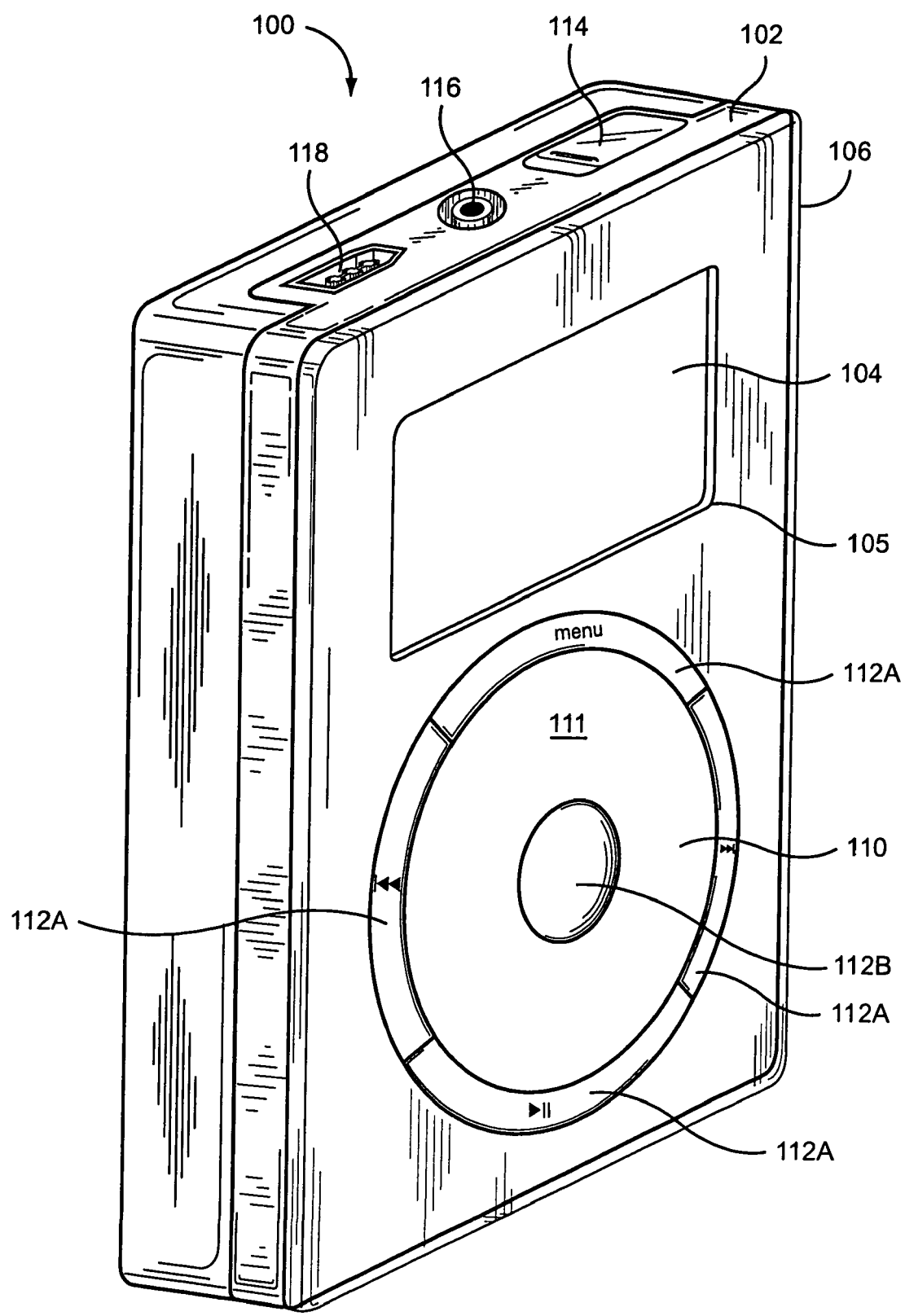
FIG. 2 is a perspective view of a media player, in accordance with one embodiment of the present invention.

FIG. 2 is a perspective diagram of a media player 100, in accordance with one embodiment of the present invention. The term "media player" generally refers to computing devices that are dedicated to processing media such as audio, video or other images, as for example, music players, game players, video players, video recorders, cameras and the like. These devices are generally portable so as to allow a user to listen to music, play games or video, record video or take pictures wherever the user travels. In one embodiment, the media player is a handheld device that is sized for placement into a pocket of the user. By being pocket sized, the user does not have to directly carry the device and therefore the device can be taken almost anywhere the user travels (e.g., the user is not limited by carrying a large, bulky and often heavy device, as in a portable computer). For example, in the case of a music player, a user may use the device while working out at the gym. In case of a camera, a user may use the device while mountain climbing. Furthermore, the device may be operated by the users hands, no reference surface such as a desktop is needed (this is shown in greater detail in FIG. 3).

Media players generally have connection capabilities that allow a user to upload and download data to and from a host device such as a general purpose computer (e.g., desktop computer, portable computer). For example, in the case of a camera, photo images may be downloaded to the general purpose computer for further processing (e.g., printing). With regards to music players, songs and play lists stored on the general purpose computer may be downloaded into the music player. In the illustrated embodiment, the media player 100 is a pocket sized hand held MP3 music player that allows a user to store a large collection of music. By way of example, the MP3 music player may store up to 1,000 CD-quality songs.

As shown in FIG. 2, the media player 100 includes a housing 102 that encloses internally various electrical components (including integrated circuit chips and other circuitry) to provide computing operations for the media player 100. The integrated circuit chips and other circuitry may include a microprocessor, memory (e.g., ROM, RAM), a power supply (e.g., battery), a circuit board, a hard drive, and various input/output (I/O) support circuitry. In the case of music players, the electrical components may include components for outputting music such as an amplifier and a digital signal processor (DSP). In the case of video recorders or cameras the electrical components may include components for capturing images such as image sensors (e.g., charge coupled device (CCD) or complimentary oxide semiconductor (CMOS)) or optics (e.g., lenses, splitters, filters). In addition to the above, the housing may also define the shape or form of the media player. That is, the contour of the housing 102 may embody the outward physical appearance of the media player 100.

The media player 100 also includes a display screen 104. The display screen 104 is used to display a graphical user interface as well as other information to the user (e.g., text, objects, graphics). By way of example, the display screen 104 may be a liquid crystal display (LCD). In one particular embodiment, the display screen corresponds to a 160-by-128-pixel high-resolution display, with a white LED backlight to give clear visibility in daylight as well as low-light conditions. As shown, the display screen 104 is visible to a user of the media player 100 through an opening 105 in the housing 102, and through a transparent wall 106 that is disposed in front of the opening 105. Although transparent, the transparent wall 106 may be considered part of the housing 102 since it helps to define the shape or form of the media player 100.

The media player 100 also includes a touch pad 110. The touch pad 110 is configured to provide one or more control functions for controlling various applications associated with the media player 100. For example, the touch initiated control function may be used to move an object or perform an action on the display screen 104 or to make selections or issue commands associated with operating the media player 100. In most cases, the touch pad 110 is arranged to receive input from a finger moving across the surface of the touch pad 110 in order to implement the touch initiated control function. The touch pad may be widely varied. For example, the touch pad be a conventional touch pad based on the Cartesian coordinate system, or the touch pad may be a touch pad based on a polar coordinate system (the later will be described in greater detail below).

The manner in which the touch pad 110 receives input may be widely varied. In one embodiment, the touch pad 110 is configured receive input from a linear finger motion. In another embodiment, the touch pad 110 is configured receive input from a rotary or swirling finger motion. In yet another embodiment, the touch pad 110 is configured receive input from a radial finger motion. Additionally or alternatively, the touch pad 110 may be arranged to receive input from a finger tapping on the touch pad 100. By way of example, the tapping finger may initiate a control function for playing a song, opening a menu and the like.

In one embodiment, the control function corresponds to a scrolling feature. For example, in the case of an MP3 player, the moving finger may initiate a control function for scrolling through a song menu displayed on the display screen 104. The term "scrolling" as used herein generally pertains to moving displayed data or images (e.g., text or graphics) across a viewing area on a display screen 104 so that a new set of data (e.g., line of text or graphics) is brought into view in the viewing area. In most cases, once the viewing area is full, each new set of data appears at the edge of the viewing area and all other sets of data move over one position. That is, the new set of data appears for each set of data that moves out of the viewing area. In essence, the scrolling function allows a user to view consecutive sets of data currently outside of the viewing area. The viewing area may be the entire viewing area of the display screen 104 or it may only be a portion of the display screen 104 (e.g., a window frame).

The direction of scrolling may be widely varied. For example, scrolling may be implemented vertically (up or down) or horizontally (left or right). In the case of vertical scrolling, when a user scrolls down, each new set of data appears at the bottom of the viewing area and all other sets of data move up one position. If the viewing area is full, the top set of data moves out of the viewing area. Similarly, when a user scrolls up, each new set of data appears at the top of the viewing area and all other sets of data move down one position. If the viewing area is full, the bottom set of data moves out of the viewing area. In one implementation, the scrolling feature may be used to move a Graphical User Interface (GUI) vertically (up and down), or horizontally (left and right) in order to bring more data into view on a display screen. By way of example, in the case of an MP3 player, the scrolling feature may be used to help browse through songs stored in the MP3 player. The direction that the finger moves may be arranged to control the direction of scrolling. For example, the touch pad may be arranged to move the GUI vertically up when the finger is moved in a first direction and vertically down when the finger is moved in a second direction To elaborate, the display screen 104, during operation, may display a list of media items (e.g., songs). A user of the media player 100 is able to linearly scroll through the list of media items by moving his or her finger across the touch pad 110. As the finger moves around the touch pad 110, the displayed items from the list of media items are varied such that the user is able to effectively scroll through the list of media items. However, since the list of media items can be rather lengthy, the invention provides the ability for the user to rapidly traverse (or scroll) through the list of media items. In effect, the user is able to accelerate their traversal of the list of media items by moving his or her finger at greater speeds.

In one embodiment, the media player 100 via the touch pad 110 is configured to transform a swirling or whirling motion of a finger into translational or linear motion, as in scrolling, on the display screen 104. In this embodiment, the touch pad 110 is configured to determine the angular location, direction, speed and acceleration of the finger when the finger is moved across the top planar surface of the touch pad 110 in a rotating manner, and to transform this information into signals that initiate linear scrolling on the display screen 104. In another embodiment, the media player 100 via the touch pad 110 is configured to transform radial motion of a finger into translational or linear motion, as in scrolling, on the display screen 104. In this embodiment, the touch pad 110 is configured to determine the radial location, direction, speed and acceleration of the finger when the finger is moved across the top planar surface of the touch pad 110 in a radial manner, and to transform this information into signals that initiate linear scrolling on the display screen 104. In another embodiment, the media player 100 via the touch pad 202 is configured to transform both angular and radial motion of a finger into translational or linear motion, as in scrolling, on the display screen 104.

The touch pad generally consists of a touchable outer surface 111 for receiving a finger for manipulation on the touch pad 110. Although not shown in FIG. 2, beneath the touchable outer surface 111 is a sensor arrangement. The sensor arrangement includes a plurality of sensors that are configured to activate as the finger passes over them. In the simplest case, an electrical signal is produced each time the finger passes a sensor. The number of signals in a given time frame may indicate location, direction, speed and acceleration of the finger on the touch pad, i.e., the more signals, the more the user moved his or her finger. In most cases, the signals are monitored by an electronic interface that converts the number, combination and frequency of the signals into location, direction, speed and acceleration information. This information may then be used by the media player 100 to perform the desired control function on the display screen 104.

The position of the touch pad 110 relative to the housing 102 may be widely varied. For example, the touch pad 110 may be placed at any external surface (e.g., top, side, front, or back) of the housing 102 that is accessible to a user during manipulation of the media player 100. In most cases, the touch sensitive surface 111 of the touch pad 110 is completely exposed to the user. In the illustrated embodiment, the touch pad 110 is located in a lower, front area of the housing 102. Furthermore, the touch pad 110 may be recessed below, level with, or extend above the surface of the housing 102. In the illustrated embodiment, the touch sensitive surface 111 of the touch pad 110 is substantially flush with the external surface of the housing 102.

The shape of the touch pad 110 may also be widely varied. For example, the touch pad 110 may be circular, rectangular, triangular, and the like. In general, the outer perimeter of the shaped touch pad defines the working boundary of the touch pad. In the illustrated embodiment, the touch pad 110 is circular. Circular touch pads allow a user to continuously swirl a finger in a free manner, i.e., the finger can be rotated through 360 degrees of rotation without stopping. Furthermore, the user can rotate his or her finger tangentially from all sides thus giving it more range of finger positions. For example, when the media player is being held, a left handed user may choose to use one portion of the touch pad 110 while a right handed user may choose to use another portion of the touch pad 110. More particularly, the touch pad is annular, i.e., shaped like or forming a ring. When annular, the inner and outer perimeter of the shaped touch pad defines the working boundary of the touch pad.

In addition to above, the media player 100 may also include one or more buttons 112. The buttons 112 are configured to provide one or more dedicated control functions for making selections or issuing commands associated with operating the media player 100. By way of example, in the case of an MP3 music player, the button functions may be associated with opening a menu, playing a song, fast forwarding a song, seeking through a menu and the like. In most cases, the button functions are implemented via a mechanical clicking action. The position of the buttons 112 relative to the touch pad 110 may be widely varied. For example, they may be adjacent one another or spaced apart. In the illustrated embodiment, the buttons 112 are configured to surround the inner and outer perimeter of the touch pad 110. In this manner, the buttons 112 may provide tangible surfaces that define the outer boundaries of the touch pad 110. As shown, there are four buttons 112A that surround the outer perimeter and one button 112B disposed in the center or middle of the touch pad 110. By way of example, the plurality of buttons 112 may consist of a menu button, play/stop button, forward seek button and a reverse seek button, and the like.

Moreover, the media player 100 may also include a power switch 114, a headphone jack 116 and a data port 118. The power switch 114 is configured to turn the media device 100 on and off. The headphone jack 116 is capable of receiving a headphone connector associated with headphones configured for listening to sound being outputted by the media device 100. The data port 118 is capable of receiving a data connector/cable assembly configured for transmitting and receiving data to and from a host device such as a general purpose computer. By way of example, the data port 118 may be used to upload or down load songs to and from the media device 100. The data port 118 may be widely varied. For example, the data port may be a PS/2 port, a serial port, a parallel port, a USB port, a Firewire port and the like. In some cases, the data port 118 may be a radio frequency (RF) link or optical infrared (IR) link to eliminate the need for a cable. Although not shown in FIG. 2, the media player 100 may also include a power port that receives a power connector/cable assembly configured for delivering powering to the media player 100. In some cases, the data port 118 may serve as both a data and power port.

Figure 3A:
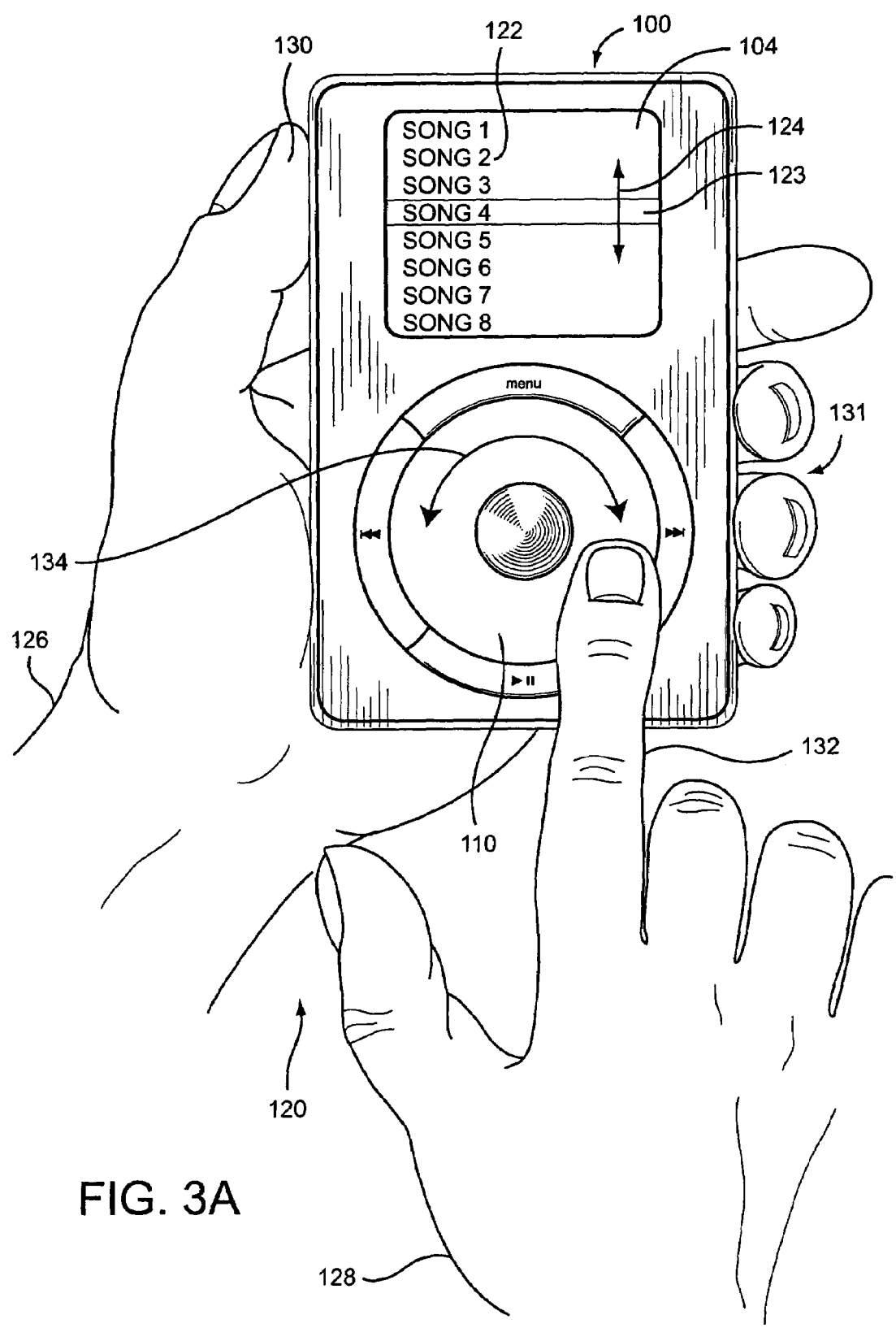
FIG. 3 is top view of a media player in use, in accordance with one embodiment of the present invention.
Figure 3B:
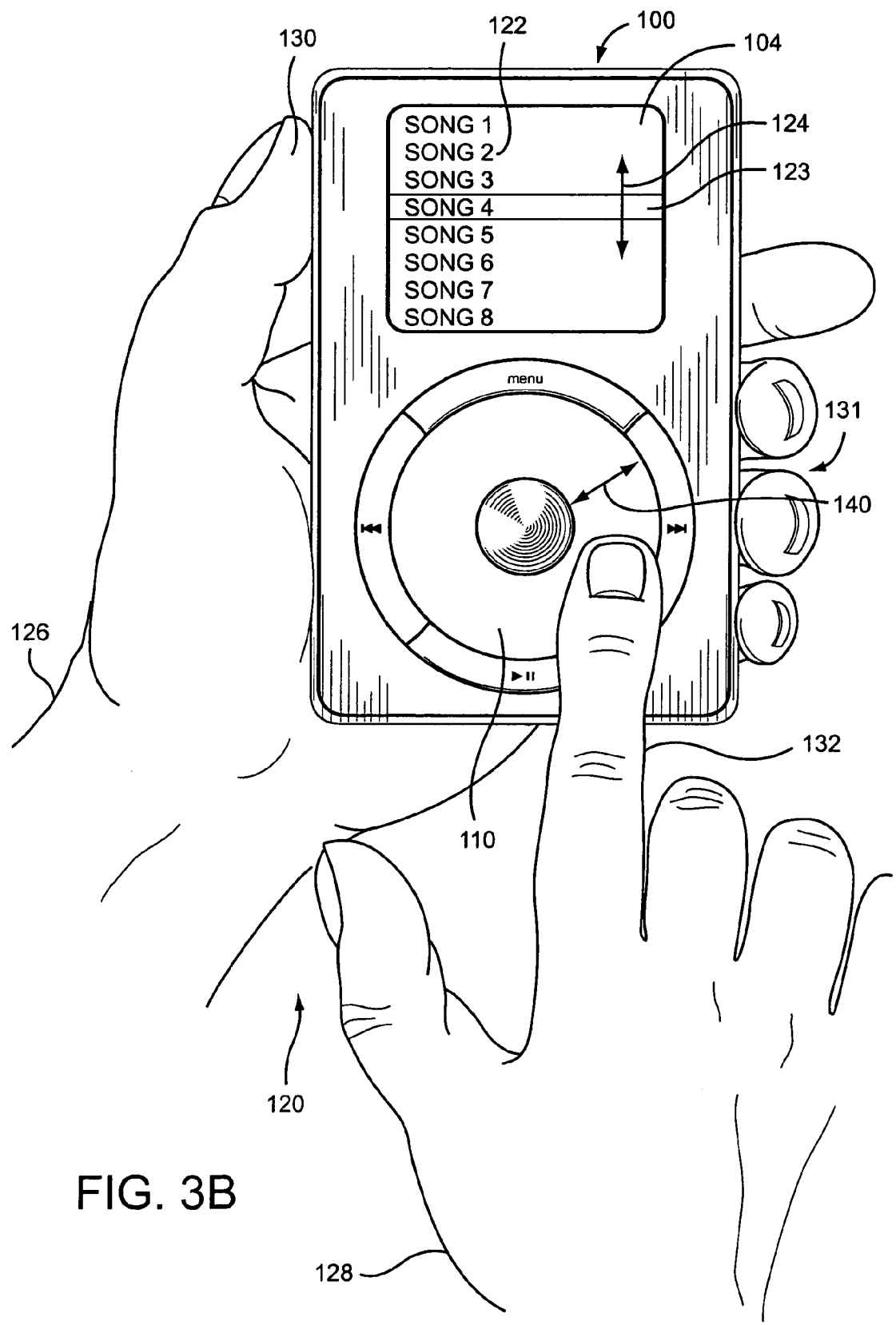
Figure 3C:
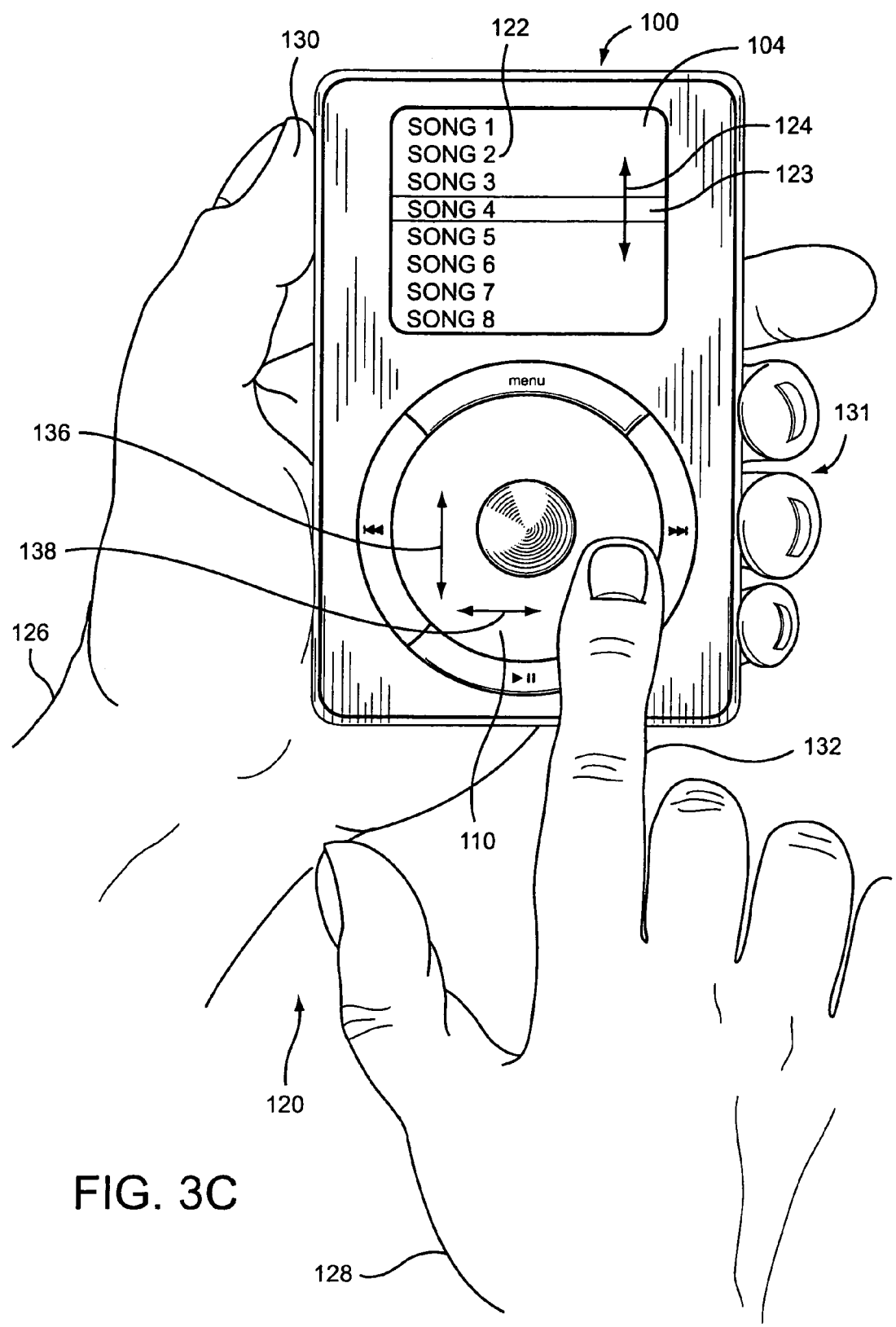

FIGS. 3A-3C show the media player 100 of FIG. 2 being used by a user 120, in accordance with different embodiments of the invention. In all of these embodiments, the user 120 is linearly scrolling 104 (as shown by arrow 124) through a list of songs 122 displayed on the display screen via a slider bar 123. As shown, the media device 100 is comfortably held by one hand 126 while being comfortably addressed by the other hand 128. This configuration generally allows the user 120 to easily actuate the touch pad 110 with one or more fingers. For example, the thumb 130 and rightmost fingers 131 (or leftmost fingers if left handed) of the first hand 126 are used to grip the sides of the media player 100 while a finger 132 of the opposite hand 128 is used to actuate the touch pad 110. As shown, the entire top surface of the touch pad 110 is accessible to the user's finger 130.

Referring to FIG. 3A, and in accordance with one embodiment of the invention, the touch pad 110 can be continuously actuated by a simple swirling motion of the finger 132 as shown by arrow 134. By swirling, it is meant that the finger moves in an arcuate or circular manner. For example, the finger may rotate relative to an imaginary axis. In particular, the finger can be rotated through 360 degrees of rotation without stopping. This form of motion may produce continuous or incremental scrolling on the display screen 104.

Referring to FIG. 3B, and in accordance with one embodiment of the invention, the user 120 can slide his or her finger 132 radially between the inner and outer perimeter of the touch pad 110. For example, the touch pad 110 may be actuated radially as shown by arrow 140.

Referring to FIG. 3C, and in accordance with one embodiment of the invention, the user 120 can slide his or her finger 132 substantially tangentially from all sides of the touch pad 110. For example, the touch pad 110 may be actuated forwards and backwards as shown by arrows 136 and side to side by arrows 138.

Figure 4:
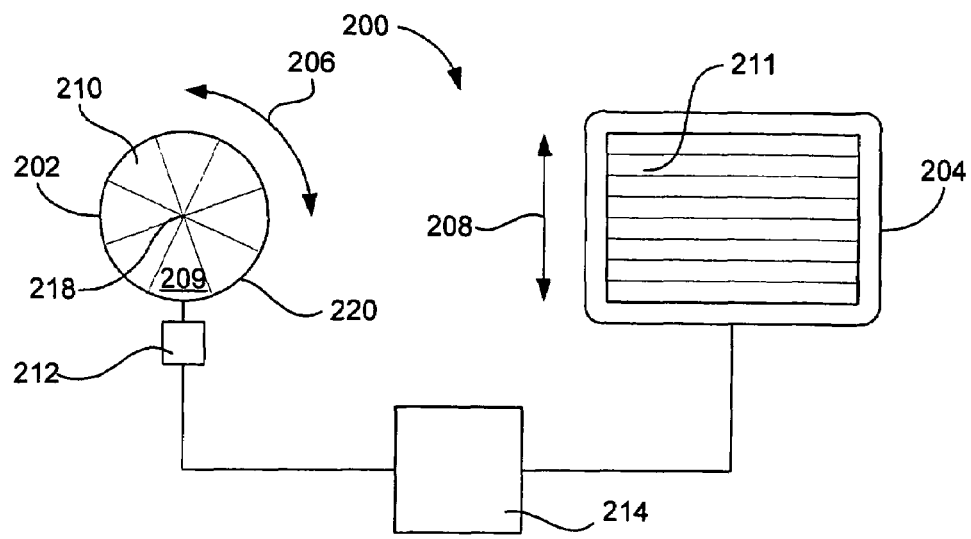
FIG. 4 is a simplified block diagram of a touchpad/display system, in accordance with one embodiment of the present invention.

FIG. 4 is a block diagram of a touchpad/display system 200, in accordance with one embodiment of the invention. By way of example, the touchpad/display system 200 may be used in the media player shown in FIGS. 2 and 3. The touchpad/display system 200 utilizes a touch pad 202 and a display screen 204. The touchpad/display system 200 via the touch pad 202 is configured to transform a swirling or whirling motion 206 of an object such as a finger (as shown in FIG. 3A) into translational or linear motion 208 on the display screen 204. In one embodiment, the touch pad 202 is arranged to continuously determine the angular position of an object relative to the planar surface 209 of the touch pad 202. This allows a user to linearly scroll through a media list 211 on the display screen 204 by swirling the object at least partially around the touch pad 202. For example, by moving the object between any angular positions (e.g., 0-360) on the touch pad 202.

As shown, the touch pad 202 is divided into several independent and spatially distinct zones 210 that are positioned around the periphery of the touch pad 202. Any number of zones may be used. In one embodiment, each of the zones 210 represents a polar angle that specifies the angular position of the zone in the plane of the touch pad 202. By way of example, the zones 210 may be positioned at 2 degree increments all the way around the touch pad 202. Each of the zones 210 has an associated sensor disposed therein for detecting the presence of an object such as a finger. The sensors may be widely varied. For example, the sensors may be based on resistive sensing, surface acoustic wave sensing, pressure sensing (e.g., strain gauge, pressure plates, piezoelectric transducers or the like), optical sensing, capacitive sensing and the like. In general, when an object approaches a zone 210, and more particularly a sensor, a position signal is generated that informs the media system 200 that the object is at a specific angular position on the touch pad 202. When an object is moved between zones 210 or over multiple zones 210, multiple position signals are generated. These multiple position signals may be used to determine the angular location, direction, speed and acceleration of the object as its moved around the touch pad 202.

The system 200 also includes a control assembly 212 that is coupled to the touch pad 202. The control assembly 212 is configured to acquire the position signals from the sensors and to supply the acquired signals to a processor 214 of the system. By way of example, the control assembly 212 may include an application specific integrated circuit (ASIC) that is configured to monitor the signals from the sensors, to compute the angular location, direction, speed and acceleration of the monitored signals and to report this information to the processor 214.

The processor 214 is coupled between the control assembly 212 and the display screen 204. The processor 214 is configured to control motion inputs to the display screen 204. In one sequence, the processor 214 receives angular motion information from the control assembly 212 and then determines the next items of the media list 211 that are to be presented on the display screen 204. In making this determination, the processor 214 can take into consideration the length of the media list 211. Typically, the processor 214 will determine the rate of movement of the finger such that the transitioning to different items in the media list 211 can be performed faster when the finger is moved at greater speeds. In effect, to the user, the more rapid swirling of the finger enables effective acceleration of the transitioning of the list of media items 211. Alternatively, the control assembly 212 and processor 214 may be combined in some embodiments.

Although not shown, the processor 214 can also control a buzzer to provide audio feedback to a user. The audio feedback can, for example, be a clicking sound produced by the buzzer. In one embodiment, the buzzer 216 is a piezoelectric buzzer. As the rate of transitioning through the list of media items increases, the frequency of the clicking sounds increases. Alternatively, when the rate that the finger is moved slows, the rate of transitioning through the list of media items decreases, and thus the frequency of the clicking sounds correspondingly slows. Hence, the clicking sounds provide audio feedback to the user as to the rate in which the media items within the list of media items are being traversed.

Additionally or alternatively, the system via the touch pad may be configured to transform radial motion an object such as a finger (as shown in FIG. 3B) into translational or linear motion on the display screen. By radial, it is meant that the object moves in a substantially radial direction from the center of the touch pad to an outer perimeter of the touch pad. In one embodiment, the touch pad is arranged to continuously determine the radial position of a finger relative to the planar surface of the touch pad. This allows a user to linearly scroll through a media list on the display screen by moving the object at least partially between the center and outer perimeter of the touch pad. For example, by moving the object between a small and large radius (e.g., 0-3 cm) on the touch pad. This may also allow a user to vary a characteristic of the media player. For example, by moving radially, the user may be able to change the volume of sound being played on the media player (i.e., acts like a potentiometer).

Figure 5:
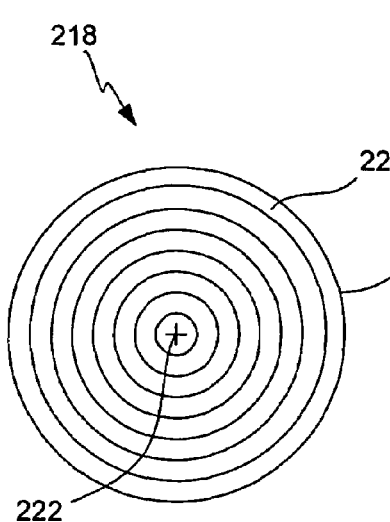
FIG. 5 is a top view of a sensor arrangement of a touch pad, in accordance with another embodiment of the present invention.

Referring to FIG. 5, a radial touch pad 218 will be discussed in accordance with one embodiment. By way of example, the touch pad 218 may replace the touch pad shown in FIG. 4. The touch pad 218 may be divided into several independent and spatially distinct zones 220 that are positioned radially from the center 222 of the touch pad 218 to the perimeter 224 of the touch pad 218. Any number of radial zones may be used. In one embodiment, each of the radial zones 220 represents a radial position in the plane of the touch pad 218. By way of example, the zones 220 may be spaced at 5 mm increments. Like above, each of the zones 220 has an associated sensor disposed therein for detecting the presence of an object such as a finger. In general, when an object approaches a zone 220, and more particularly a sensor, a position signal is generated that informs the system 200 that the object is at a specific radial position on the touch pad 218. When an object is moved between zones 220 or over multiple zones 220, multiple position signals are generated. These multiple position signals may be used to determine radial location, direction, speed and acceleration of the object as its moved radially across the touch pad 218.

Figure 6:
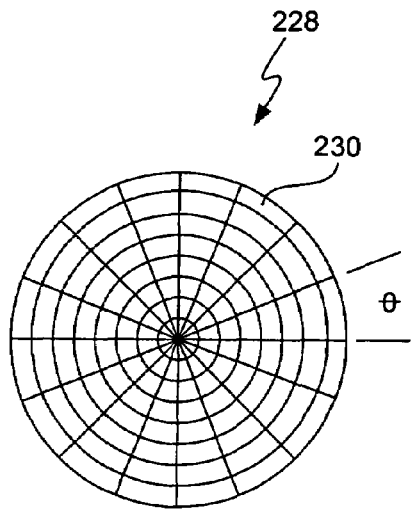
FIG. 6 is a top view of a sensor arrangement of a touch pad, in accordance with another embodiment of the present invention.

Referring to FIG. 6, a combination angular/radial touch pad 228 will be discussed in accordance with one embodiment. By way of example, the touch pad 228 may replace the touch pad shown in FIG. 4. The touch pad 228 may be divided into several independent and spatially distinct zones 230 that are positioned both angularly and radially about the periphery of the touch pad 228 and from the center of the touch pad 202 to the perimeter of the touch pad 228. Any number of combination zones may be used. In one embodiment, each of the combination zones 230 represents both an angular and radial position in the plane of the touch pad 228. By way of example, the zones may be positioned at both 2 degrees and 5 mm increments. Like above, each of the combination zones 230 has an associated sensor disposed therein for detecting the presence of an object such as a finger. In general, when an object approaches a combination zone 230, and more particularly a sensor, a position signal is generated that informs the system 200 that the object is at a specific angular and radial position on the touch pad 228. When an object is moved between combination zones 230 or over multiple combinations zones 230, multiple position signals are generated. These multiple position signals may be used to determine location, direction, speed and acceleration of the object as its angularly and radially moved across the touch pad 228. The angular and radial zones may be initiated at the same time or they may be initiated at different times. For example, the angular zones may be initiated for scrolling through a media player and the radial zones may be initiated for varying the volume of a media player.

It should be noted that although the touch pads of FIGS. 4-6 are all shown as circular that they may take on other forms such as other curvilinear shapes (e.g., oval, annular and the like), rectilinear shapes (e.g., hexagon, pentagon, octagon, rectangle, square, and the like) or a combination of curvilinear and rectilinear (e.g., dome).

Figure 7:
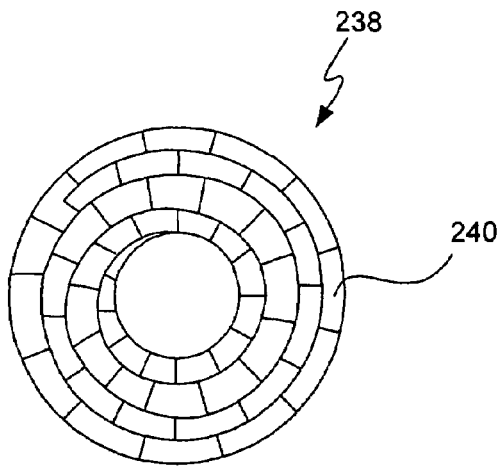
FIG. 7 is a top view of a sensor arrangement of a touch pad, in accordance with another embodiment of the present invention.

Furthermore, in order to provide higher resolution, a more complex arrangement of zones may be used. For example, as shown in FIG. 7, the touch pad 238 may include angular and radial zones 240 that are broken up such that consecutive zones do not coincide exactly. In this embodiment, the touch pad 202 has an annular shape and the zones 240 follow a spiral path around the touch pad 202 from the center to the outer perimeter of the touch pad 202.

Figure 8:
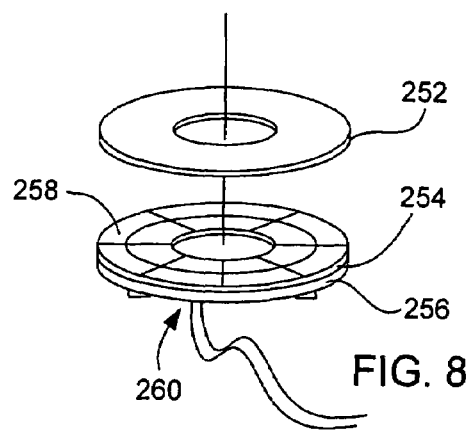
FIG. 8 is a partially broken away perspective view of an annular capacitive touch pad, in accordance with one embodiment of the present invention.

FIG. 8 is a partially broken away perspective view of an annular capacitive touch pad 250, in accordance with one embodiment of the present invention. By way of example, the annular capacitive touch pad 250 may correspond to the touch pad of FIG. 2. The annular capacitive touch pad 250 is arranged to detect changes in capacitance as the user swirls an object such as a finger around the touch pad 250. The annular capacitive touch pad 250 is also arranged to detect changes in capacitance as the user moves their finger radially across the touch pad 250. The annular capacitive touch pad 250 is formed from various layers including at least a label layer 252, an electrode layer 254 and a circuit board 256. The label layer 252 is disposed over the electrode layer 254 and the electrode layer 254 is disposed over the circuit board 256. At least the label 252 and electrode layer 254 are annular such that they are defined by concentric circles, i.e., they have an inner perimeter and an outer perimeter. The circuit board 256 is generally a circular piece having an outer perimeter that coincides with the outer perimeter of the label 252 and electrode layer 254. It should be noted, however, that in some cases the circuit board 256 may be annular or the label 252 and electrode layer 254 may be circular.

The label layer 252 serves to protect the underlayers and to provide a surface for allowing a finger to slide thereon. The surface is generally smooth so that the finger does not stick to it when moved. The label layer 252 also provides an insulating layer between the finger and the electrode layer 254. The electrode layer 254 includes a plurality of spatially distinct electrodes 258 that have positions based on the polar coordinate system. For instance, the electrodes 258 are positioned both angularly and radially on the circuit board 256 such that each of the electrodes 258 defines a distinct angular and radial position thereon. Any suitable number of electrodes 258 may be used. In most cases, it would be desirable to increase the number of electrodes 258 so as to provide higher resolution, i.e., more information can be used for things such as acceleration.

When configured together, the touch pad 250 provides a touch sensitive surface that works according to the principals of capacitance. As should be appreciated, whenever two electrically conductive members come close to one another without actually touching, their electric fields interact to form capacitance. In this configuration, the first electrically conductive member is one or more of the electrodes 258 and the second electrically conductive member is the finger of the user. Accordingly, as the finger approaches the touch pad 250, a tiny capacitance forms between the finger and the electrodes 258 in close proximity to the finger. The capacitance in each of the electrodes 258 is measured by control circuitry 260 located on the backside of the circuit board 256. By detecting changes in capacitance at each of the electrodes 258, the control circuitry 260 can determine the angular location, direction, speed and acceleration of the finger as it is moved across the touch pad 250. The control circuitry 260 can also report this information in a form that can be used by a computing device. By way of example, the control circuitry may include an ASIC (application specific integrated circuit).

Figure 9:
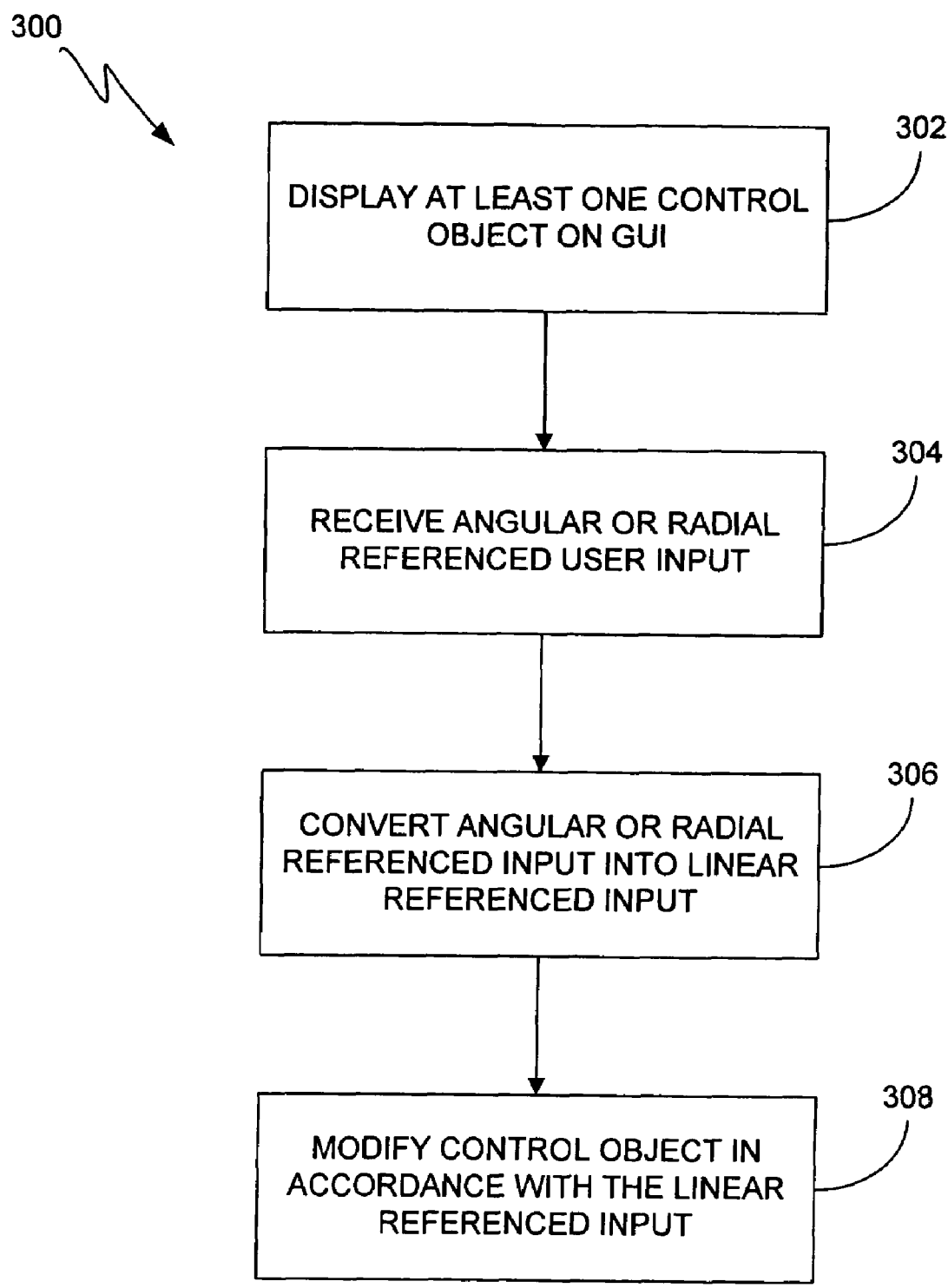
FIG. 9 is a flow diagram of touch pad-display processing, in accordance with one embodiment of the invention.

FIG. 9 is a flow diagram of touch pad-display processing 300, in accordance with one embodiment of the invention. The touch pad-display processing 300 allows a user to interact with a graphical user interface of a computing device. The touch pad-display processing 300 generally begins at block 302 where at least one control object is displayed on the graphical user interface. By way of example, the control object may be a slider bar that highlights information from a list in a menu displayed on a graphical user interface on a display screen. The displayed control object is generally controlled by the processor 214 illustrated in FIG. 3. Following block 302, the touch pad-display processing proceeds to block 304 where a user input is received. The user input may be received by the processor 214 illustrated in FIG. 3. In one embodiment, the user input is an angular referenced input, as for example, a user input produced by a rotational user action such as a finger swirling across the touch pad. By way of example, the touch pad may correspond to the touch pad illustrated in FIG. 3. In another embodiment, the user input is a radial referenced input, as for example, a user input produced by a radial user action such as a finger radially moving across the touch pad. By way of example, the touch pad may correspond to the touch pad illustrated in FIG. 4.

Following block 304, the touch pad-display processing proceeds to block 306 where the angular or radial referenced user input is converted into a linear referenced input. The conversion may be implemented by the processor 212 illustrated in FIG. 3. Following block 306, the touch pad-display processing proceeds to block 308 where control object is modified in accordance with the linear referenced input. For example, the control object such as a slider bar may be linearly moved from a first item to a second item on a list or it may be moved through multiple items on a list (e.g., scrolling). The modification is generally implemented when the processor 214 illustrated in FIG. 3 supplies the linear referenced input to the graphical user interface on the display screen.

The various aspects of the invention described above can be used alone or in various combinations. The invention is preferably implemented by a combination of hardware and software, but can also be implemented in hardware or software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over a network coupled computer systems so that the computer readable code is stored and executed in a distributed fashion.

Furthermore, although a scrolling feature is described, it should be noted that a scrolling feature is not a limitation and that the touch pad may be used to manipulate other features. For example, the touch pad may be used to adjust a volume control in an audio application. In addition, the touch pad may be used to advance through frames in a movie in video editing applications. The touch pad may also be used in video game applications.

The advantages of the invention are numerous. Different embodiments or implementations may yield one or more of the following advantages. It should be noted that this is not an exhaustive list and there may be other advantages which are not described herein. One advantage of the invention is that a user is able to easily and rapidly traverse a lengthy list of media items. Another advantage of the invention is that a substantial portion of the touch pad is accessible to the user, i.e., the touch pad provides a large surface area for manipulation thereof. Another advantage of the invention is that the touch pad can be continuously actuated by a simple swirling motion of a finger, i.e., the finger can be rotated through 360 degrees of rotation without stopping. Another advantage of the invention is that the touch pad provides more range of finger positions. For example, a left handed user may choose to use one portion of the touch pad while a right handed user may choose to use another portion of the touch pad. In essence, the touch pad is more ergonomic. Another advantage of the invention is that the touch pad makes the media player more aesthetically pleasing. Another advantage of the invention is that the touch pad allows an intuitive way to scroll on a display screen. For example, the user can manipulate the his or her finger side to side for horizontal scrolling and the user can manipulate his or her finger backwards and forwards for vertical scrolling.

While this invention has been described in terms of several preferred embodiments, there are alterations, permutations, and equivalents, which fall within the scope of this invention. For example, although the invention has been described in terms of an MP3 music player, it should be appreciated that certain features of the invention may also be applied to other types of media players such as video recorders, cameras, and the like. Furthermore, the MP3 music player described herein is not limited to the MP3 music format. Other audio formats such as MP3 VBR (variable bit rate), AIFF and WAV formats may be used. Moreover, certain aspects of the invention are not limited to handheld devices. For example, the touch pad may also be used in other computing devices such as a portable computer, personal digital assistants (PDA), cellular phones, and the like. The touch pad may also be used a stand alone input device that connects to a desktop or portable computer. It should also be noted that there are many alternative ways of implementing the methods and apparatuses of the present invention. For example, although the touch pad has been described in terms of being actuated by a finger, it should be noted that other objects may be used to actuate it in some cases. For example, a stylus or other object may be used in some configurations of the touch pad. It is therefore intended that the following appended claims be interpreted as including all such alterations, permutations, and equivalents as fall within the true spirit and scope of the present invention.

What is claimed is:

1. A battery powered handheld music player, comprising:
a housing that supports various electrical components that provide computing operations for the music player;
a memory device disposed inside the housing and configured to store a plurality of songs in a digital format;
a display screen provided at a first portion of a front surface of the housing, and configured to present a list of songs from the plurality of stored songs and to present a visual indicator that is capable of linearly traversing through the list of songs in order to designate a specific song from the list of songs;
a touch pad assembly provided at a second portion of the front surface of the housing, the touch pad assembly being configured to track the arcuate motion of a finger sliding thereon, the touch pad assembly including a planar touch surface that is dimensioned to allow sliding arcuate movement of a finger thereon;
a controller disposed inside the housing and configured to acquire motion information from the touch pad assembly and to control various features of the music player based on motion information provided by the touch pad assembly, the features including at least linearly moving the visual indicator through the list of songs, the linear direction and speed of the movement of the visual indicator being based at least in part on the arcuate direction and speed of the finger sliding across the planar touch surface of the touch pad assembly;
a button provided at the front surface of the housing, the button being configured to select the specific song designated by the visual indicator;
an audio feedback device disposed inside the housing, and configured to provide audio feedback in conjunction with movement of the visual indicator as it traverses through the song list; and
audio output components for outputting music associated with the selected specific song from the list of songs, the components including at least an amplifier and a headphone jack.

2. The music player as recited in claim 1 wherein the touch pad assembly is based on capacitance.

3. The music player as recited in claim 1 wherein the features further include controlling the volume of the music that is outputted by the music player.

4. The music player as recited in claim 1 wherein the planar touch surface is circular.

5. The music player as recited in claim 1 wherein the top of the planar touch surface is recessed.

6. The music player as recited in claim 1 further including a data port capable of receiving a data connector/cable assembly for the purpose of uploading or downloading songs to and from the music player, the data port being located at the bottom surface of the music player.

7. A battery powered handheld music player, comprising:
a housing that supports various electrical components that provide computing operations for the music player;a memory device disposed inside the housing and configured to store a plurality of songs in a digital format;
a display screen provided at a front surface of the housing, and configured to present a list of songs from the plurality of stored songs and to present a visual indicator that is capable of linearly traversing through the list of songs in order to designate a specific song from the list of songs; a touch pad assembly provided at the front surface of the housing, the touch pad assembly being configured to track the arcuate motion of a finger sliding thereon, the touch pad assembly including a planar touch surface that is dimensioned to allow sliding movement of a finger thereon;
a controller disposed inside the housing and configured to acquire motion information from the touch pad assembly and to control various features of the music player based on motion information provided by the touch pad assembly, the features including at least linearly moving the visual indicator through the list of songs, the direction and speed of the movement of the visual indicator being based at least in part on the arcuate direction and speed of the finger sliding across the planar touch surface of the touch pad assembly;
audio output components for outputting music associated with the selected specific song from the list of songs, the components including at least an amplifier and a headphone jack.

8. The music player as recited in claim 7 wherein the touch pad assembly is formed from various interconnected layers including, a label layer; an electrode layer disposed below the label layer and having a shape that substantially coincides with the shape of the label layer, the electrode layer including a plurality of spatially separated electrodes for processing input from sliding finger motion; a circuit board disposed below the electrode layer; and control circuitry disposed below the circuit board and configured to detect capacitive changes at each of the electrodes.

9. The music player as recited in claim 7 wherein the controller is configured to transform angular motion of a finger sliding on the touch pad assembly to linear motion in the display screen.

10. The music player as recited in claim 7 wherein the media player further comprises: at least one button provided at the front surface of the housing along with the planar touch surface.

11. The music player as recited in claim 10 wherein the button is visibly distinct from the planar touch surface.

12. The music player as recited in claim 10 wherein the button is configured to select the specific song designated by the visual indicator.

13. The music player as recited in claim 7 wherein the touch pad assembly is configured to select the specific song designated by the visual indicator.

14. The music player as recited in claim 7 further comprising an audio feedback device disposed inside the housing, and configured to provide audio feedback in conjunction with movement of the visual indicator as it traverses through the song list.

15. The music player as recited in claim 7 wherein the features further include controlling the volume of the music that is outputted by the music player.

16. The music player as recited in claim 7 wherein the display screen is visible to a user through an opening in the housing, and through a transparent wall that is disposed in front of the opening.

17. A media player for storing and playing media such as audio, video or images, the media player comprising:
- a housing that encloses internally various electrical components that provide computing operations for the media player;
- a touch pad supported at the housing and providing a first user input element for the media player, the touch pad including input areas for processing input from a finger sliding across any portion of the touch pad;
- a button that is visibly distinct from the touch pad and providing a second user input element for the media player, the button processing input from a finger pressing thereon; and
- one or more media delivery devices configured to output media,
- wherein the touch pad is arranged to receive input from a finger on a surface of the touch pad to implement a control function with respect to operation of the media player,
- a display screen configured to display text and graphics to a user of the media device, the display screen being supported by the housing,
- wherein the control function corresponds to a scrolling feature that allows an object to move linearly from one media item to another media item in a group of media items displayed on the display screen, the object designating a particular media item to be selected, the selection being performed by the button, the object moving in a linear direction and at a speed related at least in part to an arcuate direction and a speed of the finger moving in an arcuate manner relative to the touch surface of the touch pad.

18. The media player as recited in claim 17 wherein the touch pad includes angular input areas and wherein the angular input areas are configured to receive input from a swirling finger motion.

19. The media player as recited in claim 18 wherein the angular input areas are configured to receive input from a swirling finger motion.

20. The media player as recited in claim 17 wherein the button is disposed at a central portion of the touch pad.

21. The media player as recited in claim 17 wherein the button is disposed at the outer periphery of the touch pad.

22. The media player as recited in claim 17 wherein the control function is associated with making selections or issuing commands for use by the media delivery device.

23. The media player as recited in claim 17, wherein the touch pad includes angular input areas, wherein the angular input areas are configured to receive input from a swirling finger motion, and wherein the control function corresponds to a volume control feature, the volume being based on the amount of swirling finger motion.

* * * * *

UNITED STATES PATENT AND TRADEMARK OFFICE
CERTIFICATE OF CORRECTION

PATENT NO. : 7,348,967 B2
APPLICATION NO. : 11/386238
DATED : March 25, 2008
INVENTOR(S) : Stephen P. Zadesky et al.

It is certified that error appears in the above-identified patent and that said Letters Patent is hereby corrected as shown below:

On the Title page:

Under (56) References Cited, under "U.S. PATENT DOCUMENTS," please add the following references:

| | | |
|---|---|---|
| 4,110,749 | 08/1978 | Janko et al. |
| 4,264,903 | 04/1981 | Bigelow |
| 4,719,524 | 01/1988 | Morishima et al. |
| 4,866,602 | 09/1989 | Hall |
| 4,719,516 | 04/1990 | Retter |
| 5,125,077 | 06/1992 | Hall |
| 5,179,648 | 01/1993 | Hauck |
| 5,186,646 | 02/1993 | Pederson |
| 5,237,311 | 08/1993 | Mailey et al. |
| 5,339,213 | 08/1994 | O'Callaghan |
| D349,280 | 08/1994 | Kaneko |
| 5,404,152 | 04/1995 | Nagai |
| 5,414,445 | 05/1995 | Kaneko et al. |
| 5,438,331 | 08/1995 | Gilligan et al. |
| D362,431 | 09/1995 | Kaneko et al. |
| 5,473,343 | 12/1995 | Kimmich et al. |

UNITED STATES PATENT AND TRADEMARK OFFICE
CERTIFICATE OF CORRECTION

PATENT NO. : 7,348,967 B2
APPLICATION NO. : 11/386238
DATED : March 25, 2008
INVENTOR(S) : Stephen P. Zadesky et al.

It is certified that error appears in the above-identified patent and that said Letters Patent is hereby corrected as shown below:

| | | |
|---|---|---|
| 5,473,344 | 12/1995 | Bacon et al. |
| 5,495,566 | 02/1996 | Kwatinetz |
| 5,559,943 | 09/1996 | Cyr et al. |
| 5,561,445 | 10/1996 | Michio et al. |
| 5,565,887 | 10/1996 | McCambridge et al. |
| 5,578,817 | 11/1996 | Bidiville et al. |
| 5,585,823 | 12/1996 | Duchon et al. |
| 5,596,347 | 01/1997 | Robertson et al. |
| 5,598,183 | 01/1997 | Robertson et al. |
| 5,611,040 | 03/1997 | Brewer et al. |
| 5,611,060 | 03/1997 | Belfiore et al. |
| D382,550 | 08/1997 | Kaneko et al. |
| D385,542 | 10/1997 | Kaneko et al. |
| 5,726,687 | 03/1998 | Belfiore et al. |
| 5,729,219 | 03/1998 | Armstrong et al. |
| 5,730,165 | 03/1998 | Philipp |
| 5,748,185 | 05/1998 | Stephan et al. |
| 5,751,274 | 05/1998 | Davis |
| 5,754,890 | 05/1998 | Holmdahl et al. |
| 5,786,818 | 07/1998 | Brewer et al. |

UNITED STATES PATENT AND TRADEMARK OFFICE
CERTIFICATE OF CORRECTION

PATENT NO. : 7,348,967 B2
APPLICATION NO. : 11/386238
DATED : March 25, 2008
INVENTOR(S) : Stephen P. Zadesky et al.

It is certified that error appears in the above-identified patent and that said Letters Patent is hereby corrected as shown below:

| | | |
|---|---|---|
| 5,808,602 | 09/1998 | Sellers, Charles A. |
| 5,825,353 | 10/1998 | Will |
| 5,828,364 | 10/1998 | Siddiqui |
| 5,838,304 | 11/1998 | Hall |
| D402,281 | 12/1998 | Ledbetter et al. |
| 5,850,213 | 12/1998 | Imai et al. |
| 5,856,822 | 01/1999 | Du et al. |
| 5,883,619 | 03/1999 | Ho et al. |
| 5,889,236 | 03/1999 | Gillespie et al. |
| 5,907,152 | 05/1999 | Dandiliker et al. |
| 5,907,318 | 05/1999 | Medina |
| 5,909,211 | 06/1999 | Combs et al. |
| 5,914,706 | 06/1999 | Kono |
| 5,956,019 | 09/1999 | Bang et al. |
| 5,959,611 | 09/1999 | Smailagic et al. |
| 6,002,389 | 12/1999 | Kasser et al. |
| 6,005,299 | 12/1999 | Hengst, Axel |
| 6,031,518 | 02/2000 | Adams et al. |
| 6,075,533 | 06/2000 | Chang |
| 6,084,574 | 07/2000 | Bidiville |
| 6,097,372 | 08/2000 | Suzuki |

UNITED STATES PATENT AND TRADEMARK OFFICE
CERTIFICATE OF CORRECTION

PATENT NO. : 7,348,967 B2
APPLICATION NO. : 11/386238
DATED : March 25, 2008
INVENTOR(S) : Stephen P. Zadesky et al.

It is certified that error appears in the above-identified patent and that said Letters Patent is hereby corrected as shown below:

| | | |
|---|---|---|
| 6,124,587 | 09/2000 | Bidiville |
| 6,128,006 | 10/2000 | Rosenberg et al. |
| 6,163,312 | 12/2000 | Furuya |
| 6,166,721 | 12/2000 | Kuroiwa et al. |
| 6,179,496 | 01/2001 | Chou, Chin-Wen |
| 6,181,322 | 01/2001 | Nanavati |
| 6,188,393 | 02/2001 | Shu |
| 6,191,774 | 02/2001 | Schena et al. |
| 6,198,473 | 03/2001 | Armstrong |
| 6,211,861 | 04/2001 | Rosenberg et al. |
| 6,219,038 | 04/2001 | Cho |
| D442,592 | 05/2001 | Ledbetter et al. |
| 6,225,976 | 05/2001 | Yates et al. |
| 6,225,980 | 05/2001 | Weiss et al. |
| D443,616 | 06/2001 | Fisher et al. |
| 6,243,078 | 06/2001 | Rosenberg |
| 6,256,011 | 07/2001 | Culver |
| 6,262,717 | 07/2001 | Donohue et al. |
| 6,266,050 | 07/2001 | Oh et al. |
| 6,297,795 | 10/2001 | Kato et al. |

UNITED STATES PATENT AND TRADEMARK OFFICE
CERTIFICATE OF CORRECTION

PATENT NO. : 7,348,967 B2
APPLICATION NO. : 11/386238
DATED : March 25, 2008
INVENTOR(S) : Stephen P. Zadesky et al.

It is certified that error appears in the above-identified patent and that said Letters Patent is hereby corrected as shown below:

| | | |
|---|---|---|
| 6,323,845 | 11/2001 | Robbins |
| 6,340,800 | 01/2002 | Zhai et al. |
| D454,568 | 03/2002 | Andre et al. |
| 6,373,470 | 04/2002 | Andre et al. |
| 6,377,530 | 04/2002 | Burrows |
| 6,429,852 | 08/2002 | Adams et al. |
| 6,587,091 | 07/2003 | Serpa, Michael L. |
| 6,636,197 | 10/2003 | Goldenberg |
| 6,650,975 | 11/2003 | Ruffner |
| 6,677,927 | 01/2004 | Bruck et al. |
| 6,686,904 | 02/2004 | Sherman et al. |
| 6,703,550 | 03/2004 | Chu, Lonny L. |
| 6,724,817 | 04/2004 | Simpson et al. |
| 6,727,889 | 04/2004 | Shaw |
| 6,738,045 | 05/2004 | Hinckley et al. |
| 6,791,533 | 09/2004 | Su, Chih Wen |
| 6,795,057 | 09/2004 | Gordon, Gary B. |
| 6,844,872 | 01/2005 | Farag et al. |
| 2001/0011991 | 08/2001 | Wang et al. |
| 2001/00443545 | 11/2001 | Aratani |

UNITED STATES PATENT AND TRADEMARK OFFICE
CERTIFICATE OF CORRECTION

PATENT NO. : 7,348,967 B2
APPLICATION NO. : 11/386238
DATED : March 25, 2008
INVENTOR(S) : Stephen P. Zadesky et al.

It is certified that error appears in the above-identified patent and that said Letters Patent is hereby corrected as shown below:

| | | |
|---|---|---|
| 2001/0050673 | 12/2001 | Davenport |
| 2001/0051046 | 12/2001 | Watanabe et al. |
| 2002/0030665 | 03/2002 | Ano, Tadashi |
| 2002/0033848 | 03/2002 | Sciammarella et al. |
| 2002/0089545 | 03/2002 | Levi Montalcini |
| 2002/0118169 | 08/2002 | Hinckley et al. |
| 2002/0154090 | 10/2002 | Lin, Winky |
| 2002/0158844 | 10/2002 | McLoone et al. |
| 2002/0164156 | 11/2002 | Bilbrey |
| 2002/0180701 | 12/2002 | Hayama et al. |
| 2003/0043121 | 03/2003 | Chen |
| 2003/0050092 | 03/2003 | Yun |
| 2003/0076301 | 04/2003 | Tsuk et al. |
| 2003/0076303 | 04/2003 | Huppi |
| 2003/0095096 | 05/2003 | Robbin et al. |
| 2003/0098851 | 05/2003 | Brink, Soren |
| 2004/0239622 | 12/2004 | Proctor et al. |
| 2004/0252109 | 12/2004 | Trent, Jr. et al. |

UNITED STATES PATENT AND TRADEMARK OFFICE
CERTIFICATE OF CORRECTION

PATENT NO. : 7,348,967 B2
APPLICATION NO. : 11/386238
DATED : March 25, 2008
INVENTOR(S) : Stephen P. Zadesky et al.

It is certified that error appears in the above-identified patent and that said Letters Patent is hereby corrected as shown below:

Under (56) References Cited, under "FOREIGN PATENT DOCUMENT,"

please add the following references:

| | | |
|---|---|---|
| WO | WO-98/14863 | 04/1988 |
| JP | 63-106826 | 05/1988 |
| JP | 10-326149 | 12/1988 |
| EP | 0 498 540 | 01/1992 |
| WO | WO-94/17494 | 08/1994 |
| JP | 07-319001 | 12/1995 |
| EP | 0 880 091 | 01/1998 |
| JP | 2000-215549 | 05/1998 |
| JP | 11-194883 | 07/1999 |
| JP | 11-194872 | 07/1999 |
| WO | WO-49443 | 09/1999 |
| EP | 1 026 713 | 08/2000 |
| DE | 10022537 | 11/2000 |
| DE | 19722636 | 12/2000 |

Under (56) References Cited, under "OTHER PUBLICATIONS," please add the following references:

"About Quicktip®" located at www.logicad3d.com/docs/qt.html, downloaded April 8, 2002.

UNITED STATES PATENT AND TRADEMARK OFFICE
CERTIFICATE OF CORRECTION

PATENT NO.        : 7,348,967 B2
APPLICATION NO. : 11/386238
DATED                  : March 25, 2008
INVENTOR(S)       : Stephen P. Zadesky et al.

It is certified that error appears in the above-identified patent and that said Letters Patent is hereby corrected as shown below:

"Neuros MP3 Digital Audio Computer," located at www.neurosaudio.com, downloaded April 9, 2003.

"OEM Touchpad Modules," website www.glidepoint.com/sales/modules.index.shtml, downloaded February 13, 2002.

"Product Overview – ErgoCommander®," www.logicad3d.com/products/ErgoCommander.htm, downloaded April 8, 2002.

"Product Overview – SpaceMouse® Classic," www.logicad3d.com/products/Classic.htm, downloaded April 8, 2002.

"Synaptics Touch Pad Interfacing Guide," Second Edition, March 25, 1998, Synaptics, Inc. San Jose, CA, pages 1 to 90.

Bang & Olufsen Telecom a/s "BeoCom 6000 User Guide 2000.".

Chapweske, Adam, "PS/2 Mouse/Keyboard Protocol," 1999, http://panda.cs.ndsu.nodak.edu/~achapwes/PICmicro/PS2/ps2.htm.

Fiore, Andrew, "Zen Touch Pad," Cornell University, May 2000.

Gadgetboy, "Point and click with the latest mice," CNET Asia Product Review, www.asia.cnet.com/review...are/gadgetboy/0,39001770,38023590,00.htm, downloaded December 5, 2001.

Sylvania, "Intellivision[TM] Intelligent Television MASTER COMPONENT SERVICE MANUAL." pp. 1,2 and 8, 1979.

UNITED STATES PATENT AND TRADEMARK OFFICE
CERTIFICATE OF CORRECTION

PATENT NO. : 7,348,967 B2
APPLICATION NO. : 11/386238
DATED : March 25, 2008
INVENTOR(S) : Stephen P. Zadesky et al.

It is certified that error appears in the above-identified patent and that said Letters Patent is hereby corrected as shown below:

Tessler et al., "Touchpads Three new input devices," website www.macworld.com/1996/02/review/1806.html, downloaded February 13,

2002.

"Der Klangmeister" Connect Magazine, August 1998.

Photographs of Innovations 2000 Best of Show award presented at 2000 International CES Innovations 2000 Design & Engineering Showcase, 1 pg.

BeoCom 6000, Sales Training Brochure, date unknown.

Letter re: Bang & Olufsen A/S, by David Safran, Nixon Peabody, LLP, May 21, 2004.

Marriott et al., U.S. Patent Application No. 10/722,948, filed November 25, 2003.

U.S. Patent Application No. 10/060,712, filed January 29, 2002.

U.S. Patent Application No. 10/209,537, filed July 30, 2002.

"Apple Unveils Optical Mouse and New Pro Keyboard," Press Release, July 19, 2000.

"System Service and Troubleshooting Manual," located at www.dsplib.com/intv/

Master, downloaded December 11, 2002.

Kevin DeMeyer, "Crystal Optical Mouse," February 14, 2002, Heatseekerz,

Web-Article 19.

UNITED STATES PATENT AND TRADEMARK OFFICE
CERTIFICATE OF CORRECTION

PATENT NO. : 7,348,967 B2
APPLICATION NO. : 11/386238
DATED : March 25, 2008
INVENTOR(S) : Stephen P. Zadesky et al.

It is certified that error appears in the above-identified patent and that said Letters Patent is hereby corrected as shown below:

On page 3, under (56) References Cited, under "FOREIGN PATENT DOCUMENTS,":

In Column 1, Line 13: please delete "EP    0551778 B1    1/1997".

Signed and Sealed this

Thirtieth Day of September, 2008

JON W. DUDAS
*Director of the United States Patent and Trademark Office*